US012802437B2

(12) United States Patent
Jensen et al.

(10) Patent No.: US 12,802,437 B2
(45) Date of Patent: Nov. 17, 2026

(54) HYBRID SYSTEM AND METHOD OF CROP IMAGERY CHANGE DETECTION

(71) Applicant: FARMERS EDGE INC., Winnipeg (CA)

(72) Inventors: Matthew Jensen, Raymond (CA); Gordon Logie, Raymond (CA); Alissia Paluck, Lethbridge (CA)

(73) Assignee: Farmers Edge Inc., Winnipeg (CA)

( * ) Notice: Subject to any disclaimer, the term of this patent is extended or adjusted under 35 U.S.C. 154(b) by 467 days.

(21) Appl. No.: 18/326,327

(22) Filed: May 31, 2023

(65) Prior Publication Data

US 2024/0029430 A1 Jan. 25, 2024

Related U.S. Application Data

(60) Provisional application No. 63/388,374, filed on Jul. 12, 2022.

(51) Int. Cl.
*G06V 20/10* (2022.01)
*G06V 10/74* (2022.01)

(52) U.S. Cl.
CPC .......... *G06V 20/188* (2022.01); *G06V 10/761* (2022.01)

(58) Field of Classification Search
CPC .. G06V 20/188; G06V 10/761; G06V 10/766; G06V 20/44; G06V 20/13; A01B 79/005; G06F 18/241
See application file for complete search history.

(56) References Cited

U.S. PATENT DOCUMENTS

| | | | | |
|---|---|---|---|---|
| 12,367,671 | B2 * | 7/2025 | Unno | A01G 7/00 |
| 2005/0149235 | A1 * | 7/2005 | Seal | A01B 79/005 382/110 |
| 2014/0168412 | A1 * | 6/2014 | Shulman | G06V 20/20 348/89 |
| 2018/0052114 | A1 * | 2/2018 | Takashima | G06V 10/145 |
| 2018/0213800 | A1 * | 8/2018 | Djonovic | A01N 63/36 |
| 2018/0299327 | A1 * | 10/2018 | Zhao | A01C 21/007 |
| 2020/0334458 | A1 * | 10/2020 | Glenn | G06T 17/05 |
| 2021/0158527 | A1 * | 5/2021 | Logie | G06T 7/0016 |
| 2022/0019794 | A1 * | 1/2022 | Logie | G06V 10/75 |
| 2023/0026811 | A1 * | 1/2023 | Zhou | G06F 18/214 |
| 2023/0039763 | A1 * | 2/2023 | Khait | A01B 79/005 |

* cited by examiner

*Primary Examiner* — Solomon G Bezuayehu
(74) *Attorney, Agent, or Firm* — Ryan W. Dupuis; Kyle R. Satterthwaite; Ade & Company Inc.

(57) ABSTRACT

A system and method for crop health change monitoring uses first and second crop images, before and after an event (e.g. severe weather) to detect impact of the event. Using differences in vegetation index values between the images, a vegetation index difference image is calculated. A structural similarity index measurement calculation quantifies differences between the images. Using a change layer comprising magnitude values representing a magnitude of change between the images by adding absolute difference values derived from the vegetation index difference image and boost values derived from the structural similarity index measurement, a hybrid crop health change image is generated that is indicative of crop health change by converting the magnitude values of the change layer into positive change values and negative change values according to corresponding ones of the difference values of the vegetation index difference image being positive or negative.

16 Claims, 11 Drawing Sheets

System Environment 100

Grower NDVI Difference

Agent NDVI Difference

HYBRID SYSTEM AND METHOD OF CROP IMAGERY CHANGE DETECTION

FIELD OF THE INVENTION

The present invention relates to a system and method for detection of change between images, for example remotely sensed images of a crop growing in a field, and more particularly the present invention relates to detection of change between images based in part on the difference in vegetation indices between the images to detect changes, for example to detect changes in crop health before and after a severe weather event.

BACKGROUND

With an ever-growing number of available imaging platforms, it is increasingly possible for users to get very high-frequency imagery over their Area of Interest (AOI). Commercial satellite platforms are now capable of offering sub-daily revisit frequencies, and the proliferation of commercial grade unmanned aerial platforms allows users to obtain their own imagery. However, this higher image frequency and data complexity also means it can be impractical for users to manually sort through and analyze all the available data. This is especially true for users in the agricultural industry, commonly referred to as growers.

Remotely-sensed image data and products derived from that data (i.e., imagery products) are being increasingly utilized in agriculture. This is because these data products can provide rapid, synoptic estimates of crop health condition over numerous agricultural acres. Crop health condition can be estimated using vegetation indices derived from the original image spectral data. One example vegetation index is the Normalized Difference Vegetation Index (NDVI) which can demonstrate high correlations with crop biomass, productivity, and eventual yield. NDVI and other imagery products can also provide quantitative and visual indications of deleterious crop conditions such as pest, disease, presence of weeds, or weather-related damage (i.e. hail).

Despite the utility offered by these imagery products, manual inspection of images can be very time consuming and tedious. This can be particularly true for growers operating very large farming operations. Manual inspection of images and imagery products can also require expertise and experience to properly interpret the data. As such, analytic tools and algorithms can help create streamlined workflows and products that enable users to make better data driven decisions.

Furthermore, in the instance of crop damage resulting from a weather event for example, use of differences in vegetation indexes alone can occasionally be misleading as to the amount damage to the crop.

SUMMARY OF THE INVENTION

According to one aspect of the present invention there is provided a system for crop health change monitoring of a crop growing within a field, the system comprising:

- a memory storing programming instructions thereon; and
- a computer processor arranged to execute the programming instructions stored on the memory so as to be arranged to:
  - acquire a first image of the crop growing within the field at a first point in time;
  - acquire a second image of the crop growing within the field at a second point in time, in which the first point in time is prior to the second point in time;
  - calculate a vegetation index difference image as a difference between vegetation index values of the second image and vegetation index values of the first image;
  - calculate a structural similarity index measurement image by performing a structural similarity index measurement calculation to quantify differences between the first image and the second image;
  - calculate a change layer comprising magnitude values representing a magnitude of change between the first image and the second image by adding absolute difference values derived from the vegetation index difference image and boost values derived from the structural similarity index measurement image; and
  - generate a hybrid crop health change image indicative of crop health change by converting the magnitude values of the change layer into positive change values and negative change values according to corresponding difference values of the vegetation index difference image being positive or negative.

According to a second aspect of the invention there is provided a method for crop health change monitoring of a crop growing within a field, the method comprising:

- acquiring a first image of the crop growing within the field at a first point in time;
- acquiring a second image of the crop growing within the field at a second point in time, in which the first point in time is prior to the second point in time;
- calculating a vegetation index difference image comprising difference values representing a difference between corresponding vegetation index values of the second image and corresponding vegetation index values of the first image;
- calculating a structural similarity index measurement image by performing a structural similarity index measurement calculation to quantify differences between the first image and the second image;
- calculating a change layer comprising magnitude values representing a magnitude of change between the first image and the second image by adding absolute difference values derived from the vegetation index difference image and boost values derived from the structural similarity index measurement image; and
- generating a hybrid crop health change image indicative of crop health change by converting the magnitude values of the change layer into positive change values and negative change values according to corresponding ones of the difference values of the vegetation index difference image being positive or negative.

The above hybrid calculation in which differences between vegetation indices are boosted by further differences identified through a structural similarity index measurement calculation, is referred to herein as a Hybrid Complex Add (HCA) algorithm. The HCA is a means for processing and analyzing satellite imagery to identify changes between images on a sub-field level. By comparing satellite images, HCA can compute areas of change that can provide users with valuable insights to aid in their data driven decision making process. There are many valid applications of the HCA module across various industries. For simplicity and consistency purposes, this embodiment of the HCA module will focus on utilizing HCA in the agricultural industry to detect the impact of severe weather events on an agricultural field.

The hybrid crop health change image may be generated by classifying the positive change values and the negative change values of the hybrid crop health change image into bins and distinguishing the bins from one another using a color ramp.

The crop health change may be monitored relative to an event in which said first point in time is before the event and said second point in time is after the event.

When the event is a weather event, the hybrid crop health change image may be generated to be representative of crop damage resulting from the weather event.

The method may further include: (i) acquiring a third image of the crop growing within the field at a third point in time, in which the third point in time is subsequent to the second point in time; (ii) calculating a second vegetation index difference image comprising difference values representing a difference between corresponding vegetation index values of the third image and corresponding vegetation index values of the first image; (iii) calculating a second structural similarity index measurement image by performing a structural similarity index measurement calculation to quantify differences between the first image and the third image; (iv) calculating a second change layer comprising magnitude values representing a magnitude of change between the first image and the third image by adding absolute difference values derived from the second vegetation index difference image and boost values derived from the second structural similarity index measurement image; and (v) generating a second hybrid crop health change image indicative of crop health change by converting the magnitude values of the second change layer into positive change values and negative change values according to corresponding ones of the difference values of the second vegetation index difference image being positive or negative.

The system may also generate a report that includes (i) a visual representation of the hybrid cop health change image derived from the second image, (ii) a visual representation of the second hybrid cop health change image resulting from the third image, and (iii) a plot of average vegetation index values associated with the crop over time including an indication of the event, an indication of the first point in time of the first image, an indication of the second point in time of the second image, and an indication of the third point in time of the third image represented on the plot.

The method may further include automatically selecting the first image and the second image from a time-series of remotely sensed crop images by comparing the crop images to selection criteria. When monitoring crop health change relative to an event, preferably said first point in time is before the event and said second point in time is after the event, wherein the selection criteria include a date range relative to said event. The selection criteria may include a minimum area of interest coverage threshold and/or a maximum cloud or shadow coverage threshold.

The method may further include calculating an expected change in vegetation indices between the first point in time and the second point in time representative of natural changes in the crop growing in the field resulting from a natural vegetative life cycle of the crop, and deducting the expected change in vegetation indices in the calculation of said vegetation index difference image.

The method may further include calculating the expected change by (i) calculating an expected trend line as a best fit line among mean vegetation index values of a time-series of remotely sensed crop images of crops growing in other fields having similar attributes and (ii) calculating a difference between a vegetation index value on the expected trend line at the first point in time and a vegetation index value on the expected trend line at the second point in time.

The method may further include (i) calculating a field trend line as a best fit line among mean vegetation index values of a time-series of remotely sensed crop images of the crop growing within the field, (ii) adjusting the vegetation index values of the first image such that a mean vegetation index value of the first image falls on the field trend line, and (iii) adjusting the vegetation index values of the second image such that a mean vegetation index value of the second image falls on the field trend line.

The method may further include (i) adjusting the vegetation index values for the first image by (a) calculating a first offset value for the first image corresponding to a difference between the mean vegetation index value of the first image and the trend line at the first point in time and (b) adding the first offset value to each of the vegetation index values of the first image; and (ii) adjusting the vegetation index values for the second image by (a) calculating a second offset value for the second image corresponding to a difference between the mean vegetation index value of the second image and the trend line at the second point in time and (b) adding the second offset value to each of the vegetation index values of the second image.

The method may further include converting the magnitude values of the change layer into positive change values and negative change values by: (i) for each magnitude value of the change layer corresponding to one of the difference values of the vegetation index difference image being negative, multiplying the magnitude value by −1; and (ii) for each magnitude value of the change layer corresponding to one of the difference values of the vegetation index difference image being positive, multiplying the magnitude value by 1.

The method may further include calculating the boost values by subtracting pixel values in the structural similarity index measurement image from 1.

The method may further include (i) determining if the crop is flowering in the first image or the second image by calculating a normalized difference yellowness index for the image and comparing the normalized difference yellowness index to a flowering threshold; and (ii) if the crop is determined to be flowering in either one of the first image of the second image, calculating the change layer by weighting the boost values derived from the structural similarity index measurement image more heavily than the absolute difference values derived from the vegetation index difference image.

The method may further include, if the second image is determined to be flowering and the first image is determined to be not flowering, calculating the boost values by: (i) calculating an inverse layer by subtracting pixel values in the structural similarity index measurement image from 1; (ii) identifying a prescribed percentile value among inverse values within the inverse layer; (iii) subtracting the prescribed percentile value from each inverse value to obtain resultant values; and (iv) defining the boost values as absolute values of the resultant values.

The method may further include, if the second image is determined to be flowering: (i) calculating a yellowness index change mask based on normalized difference yellowness index values of the first image and the second image; and (ii) when generating the hybrid crop health change image indicative of crop health change, converting the magnitude values of the change layer into positive change values and negative change values by multiplying the magnitude values by corresponding positive or negative values of the yellowness index change mask.

BRIEF DESCRIPTION OF THE DRAWINGS

Some embodiments of the invention will now be described in conjunction with the accompanying drawings in which:

FIG. 12(*b*) illustrates the ndvi_difference results between the pre-event NDVI and the agent image NDVI by using NDVI Difference 402 process in which the average ndvi_difference is −0.004; FIG. 12(*c*) illustrates the unexpected change of grower NDVI after adjusting ndvi_difference by the expected change as outlined in process 500 in which the average unexpected change is −0.069; and FIG. 12(*d*) illustrates the unexpected change of agent NDVI after adjusting ndvi_difference by the expected change as outline in process 500 in which the average unexpected change is −0.102. In preferred embodiments, a continuous color ramp (red-yellow-green) is stretched between min and max values of −0.35 and +0.35 such that green areas represent a positive change in NDVI, while red indicate a negative change, and light yellow areas represent pixels with change close to 0.

FIG. 13(*b*) illustrates the result of using SSIM calculation to compare a pre-event image to a grower image in which the average SSIM is 0.205. In preferred embodiments, areas with darker shades of blue indicate pixels with lower SSIM values (more change), lighter blues indicate pixels with SSIM values approaching 1 (no change). As previously mentioned, other embodiments of HCA may utilize other bands to compute SSIM. In this instance, SSIM was calculated using a combination of the NDVI and near-infrared (NIR) band.

FIG. 18(*b*) illustrates a trend difference calculated as the difference between the target trend line and the expected trend line.

FIG. 18(*c*) illustrates calculation of a syndex value representing an amount of change in the trend difference shown in FIG. 18(*b*).

In the drawings like characters of reference indicate corresponding parts in the different figures.

DETAILED DESCRIPTION

Referring to the accompanying figures, there is illustrated a system and method for detection of change between images, for example remotely sensed images of a crop growing in a field, and more particularly for detection of change between images based in part on the difference in vegetation indices between the images to detect changes, for example to detect changes in crop health before and after a severe weather event.

Figure 1:
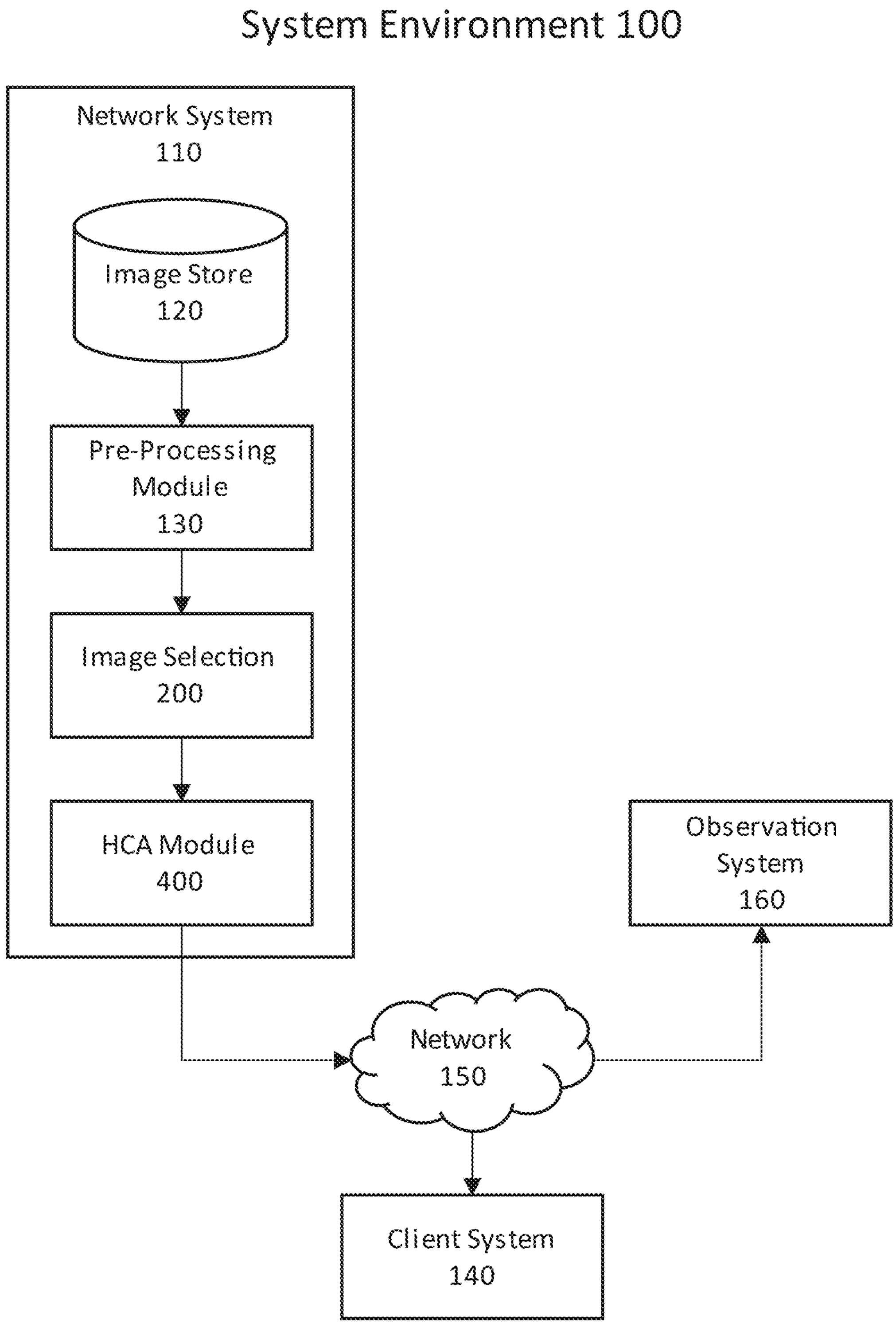
FIG. 1 illustrates a system environment for running HCA processes over an agricultural field using remotely sensed image products, according to one example embodiment.

System Environment 100. FIG. 1 illustrates a system environment for running HCA processes over an agricultural field using remotely sensed image products, according to one example embodiment. Within the system environment 100 is an observation system 160, network system 110, client system 140, and a network 150 which links the different systems together. The network system 110 includes an image store 120, Pre-processing module 130, Image selection 200, and HCA module 400.

Other examples of a system environment are possible. For example, in various embodiments, the system environment 100 may include additional or fewer systems. To illustrate, a single client system may be responsible for multiple agricultural fields. The network system may leverage observations from multiple observation systems 160 to detect crop change for each of the agricultural fields. Furthermore, the capabilities attributed to one system within the environment may be distributed to one or more other systems within the system environment 100. For example, the HCA module 400 may be executed on the client system 140 rather than the network system 110.

An observation system 160 is a system which provides remotely-sensed data of an agricultural field. In an embodiment, the remotely-sensed data is an observed image. Herein, an observed image is an image or photograph of an agricultural field taken from a remote sensing platform (e.g. an airplane, satellite, or drone). The observed image is a raster dataset composed of pixels with each pixel having a pixel value. Pixel values in an observed image may represent some ground characteristic such as, for example, a plant, a field, or a structure. The characteristics and/or objects represented by the pixels may be indicative of the crop conditions within an agricultural field in the image.

The observation system 160 may provide images of an agricultural field over a network 150 to the network system 110, wherein said images may be stored in the image store 120. Additionally or alternatively, imagery derivatives generated by the pre-processing module 130, Image Selection 200, or HCA module 400, may also be stored in the image store 120.

The pre-processing module 130 inputs an observed image and outputs a pre-processed image. The observed image may be accessed from the image store 120 or directly received from the observation system 160. A pre-processed image is the observed image that has been pre-processed for Image Selection 200 and/or HCA module 400.

The HCA module 400 uses the pre-processed image to run HCA processes. If certain criteria are met, the HCA module will generate various image derivates to be transmitted to the client system 140 via a network 150.

Imagery Pre-Processing Module 130. The pre-processing of images provided by the observation system 160 or retrieved from the image store 120 is performed using the pre-processing module 130. Pre-processing is performed to ensure images are suitable for use in the HCA module. Atmospheric correction and image filtering is the main purpose for the pre-processing module 130.

There are numerous reasons why an image may be unsuitable. Pixel values in an observed image obtained from a remote sensing platform are a measurement of electromagnetic radiation (EMR) originating from the sun (a quantity hereafter referred to as irradiance), passing through the atmosphere, being reflected or absorbed from objects on the Earth's surface (i.e. an agricultural field), then what is left passes through part or all of the atmosphere once again before being received by a remote sensor (a quantity hereafter referred to as radiance). The proportion of radiance received by a remote sensor relative to the irradiance received by these objects (a measure hereafter referred to as surface reflectance) is of primary interest to remote sensing applications, as this quantity may provide information on the characteristics of these objects. However, atmospheric effects can introduce detrimental impacts on the measured EMR signal in an observed image which can render some or all the image pixels inconsistent, inaccurate, and, generally, untenable for use in accurate detection of crop health condition changes.

Atmospheric scattering and absorption are major sources of error in surface reflectance measurements. This effect is caused when molecules in the atmosphere absorb and scatter EMR. This scattering and absorption occurs in a wavelength-dependent fashion, and impacts EMR both during its initial transmission through the atmosphere, as well as after it is reflected from the Earth's surface and received by the remote sensing platform. Atmospheric absorption and scattering can cause various deleterious effects, including: some EMR from the sun not making it to objects on the ground; some EMR from the sun scattering back into the remote sensor before reaching the ground; some EMR reflected from the ground not reaching the remote sensor. While the EMR output from the sun is well understood and relatively invariant, atmospheric scattering and absorption can vary markedly both over time and space, it depends on the type and amount of atmospheric molecules, and also depends on the path length of the EMR transmission through the atmosphere.

One adjustment for atmospheric effects is a correction of raw image data to top-of-atmosphere (TOA) reflectance units, a quantity hereafter referred to TOA reflectance. This correction converts the radiance measured by the sensor to TOA reflectance units expressed as the ratio between the radiance being received at the sensor and the irradiance from the sun, with a correction applied based on the path of the EMR both from the sun to the target as well as from the target to the remote sensor. This first order correction can mitigate for some broad temporal and spatial attenuation of EMR transmission from the atmosphere but does not account for the variable absorption and scattering which can occur from variations in the atmospheric constituent particles. It is common practice to divide TOA reflectance by 10,000 to obtain percent reflectance.

A second order correction, referred to here as atmospheric correction, attempts to mitigate and reduce the uncertainties associated with atmospheric scattering and absorption. A range of atmospheric correction techniques of varying complexity have been employed within the field of remote sensing. These techniques are well known to a person skilled in the art and are consequently not further discussed here. The end result from atmospheric correction is an estimate of surface reflectance. To mitigate the impact of atmospheric scattering and absorption, in some embodiments the image pre-processing module 130 may employ either TOA or atmospheric correction techniques.

Another source of uncertainty which may impact observed image quality is the presence of atmospheric clouds or haze, and shadows cast from clouds, which can occlude ground objects and/or attenuate the radiance reflected from these objects. As such, the pre-processing module 130 may utilize a cloud and/or shadow masking technique to detect pixels afflicted by these effects and remove them from the image. Many techniques exist within the discipline for cloud and shadow masking and are also well known to a person skilled in the art.

The pre-processing module 130 may also remove pixels from an observed image (e.g., using cropping, selective deletion, etc.). For example, an observed image may include obstacles or structures (e.g., farm houses, roads, farm equipment) that may be detrimental to assessment of the condition of crops within the field. The pre-processing module 130 may remove the impacted pixels via cropping them from the observed image or by flagging those pixels as invalid via a mask layer. Pixels impacted by clouds, shadows, and/or haze as detected by a cloud and shadow detection algorithm can also be removed/flagged in a similar fashion. The resulting image is one that provides more accurate data for analyzing crop condition.

Images that have been processed through the pre-processing module 130 are hereafter referred to as pre-processed images.

Figure 2:
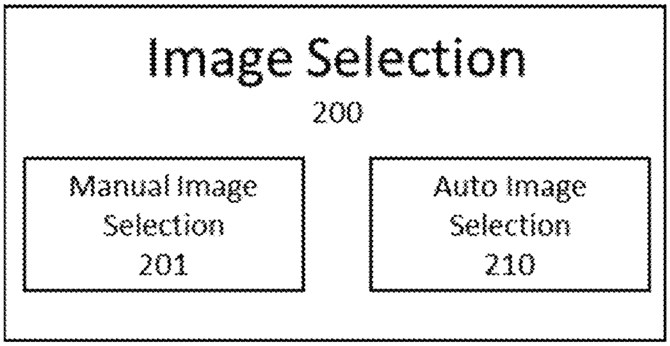
FIG. 2 shows two valid image selection methods for Image Selection Process.

Image Selection Process 200. Image Selection Process 200, or simply image selection, is the process of selecting images suitable for processing in HCA Module 400. As HCA is a module for comparing satellite images and computing the differences between them, a minimum of two images must be selected. In general, these images are referred to as a pre-event image and a post-event image. In this embodiment, an event refers to a calendar date that is important to the study of the given AOI, it is usually the date that a change on the field might have occurred; this is referred to as the event date. This known event date allows the image selection process to identify an image prior to the event (pre-event image) and an image after the event date (post-event image). Additional pre-event and/or post-event images may be selected and are considered as valid embodiments of Image Selection Process 200 and HCA module 400. For this embodiment of HCA, the event date corresponds to a hailstorm event over an agricultural field; a single pre-event image and two post-event images on different days will be selected. The two post-event images are referred to as the grower image and agent image. Ideally, these images are cloud free, have undergone pre-processing steps as outlined in the pre-processing module 130 and cover the same area of interest (AOI). There are two valid options for image selection: Manual Image Selection Process 201 and Auto Image Selection Process 210. FIG. 2 illustrates the processes and methods used for Image Selection Process 200.

Manual Image Selection 201. Manual Image Selection 201, or simply manual image selection, occurs when the user manually selects images to compare using HCA Module 400. A minimum of 2 images must be selected, one pre-event and one post-event. With manual image selection, it is up to the user to check the quality of selected images. Once the two images are selected, the desired pre-event and post-event image pair can be run through HCA Module 400.

Figure 3:
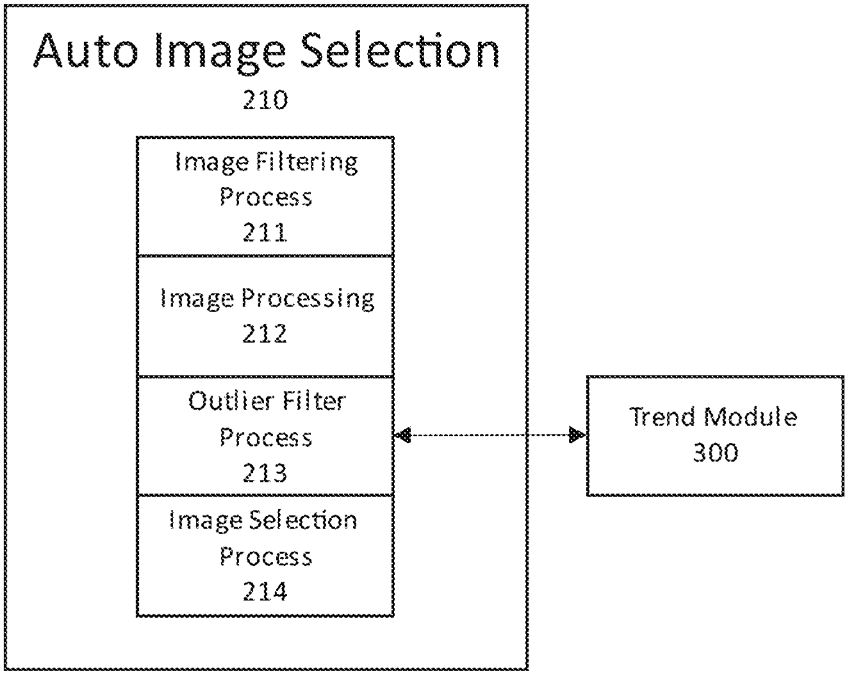
FIG. 3 represents the steps taken by the automatic image selection process.

Auto Image Selection 210. Auto Image Selection Process 210, or simply auto image selection, is an automated process of selecting images to compare using HCA Module 400. To ensure only high-quality images are selected, auto image selection performs several filtering processes to remove undesirable images and select images suitable for HCA Module 400. The subprocesses of Auto Image Selection include: Image Filtering, Image Processing, Outlier Filter, and Image Selection. FIG. 3 illustrates the subprocess used in Auto Image Selection Process 210.

Image Filtering Process 211. Image Filtering Process 211, or simply image filtering, is a processing step that filters out images that don't meet the desired quality control standards. The Image Filtering Process 211 is computed on the pool of pre-processed images as computed in the Pre-Processing Module 130. There are several quality control metrics that can be used to filter out unsuitable or undesirable images from the pool of pre-processed images.

As mentioned in the pre-processing module 130, pixels can be flagged as either cloud, and/or shadow by utilizing cloud and shadow mask techniques that exist and are well known within the satellite imagery industry. Image Filtering Process 211 may utilize cloud and/or shadow masks to remove images from further processing. For example, images with greater than 10 percent of the pixels identified as either cloud or shadow could be removed from the pre-processed image pool. Furthermore, images that do not cover at least 80% of the area of interest (AOI) could also be removed from the pre-processed image pool.

After running Image Filtering Process 211, the remaining pre-processed images that were not filtered out will be used in further processing steps; these remaining images are hereafter referred to as filtered images.

Image Processing 212. Image Processing 212, or simply image processing, is the processing that transforms the filtered images, as produced in Image Filtering Process 211, into imagery derivates and discrete data values.

One embodiment of image processing may apply a calibration correction/coefficient between images when their imagery sensors are different. For example, applying a calibration coefficient between a Sentinel 2 satellite image and a SPOT 6 satellite image will result in images that are more closely aligned in their values. Another example is applying a calibration coefficient between two different satellites of the PlanetScope constellation so that their values more closely align.

Image processing may also include the calculation of a vegetation index (VI) for the filtered images. Vegetation indices have long been used for remote sensing of vegetation since they often demonstrate high correlations with vegetation properties of interest, such as biomass, photosynthetic activity, crop yield, vegetation health, etc. As an example, Image Processing 212 may compute the Normalized Difference Vegetation Index (NDVI). The NDVI is calculated by:

$$NDVI = \frac{(NIR - \text{Red})}{(NIR + \text{Red})} \quad \text{Equation 1}$$

where NIR is the image reflectance in the near infrared (NIR) band, and Red is the image reflectance in the Red band. The NDVI is expressed as a decimal value between −1 and 1. NDVI values in the range of 0.2 to 0.8 or higher are typically considered an indication of active vegetation, with higher values being correlated with higher biomass, photosynthetic activity, etc. For this embodiment HCA module 400 will utilize NDVI in its processing, however, other embodiments may utilize the individual bands or any other vegetation index or combination of indices.

In preparation for Outlier Filter Process 213, every filtered image must be condensed into discrete values that represent the image as a whole. This embodiment of image processing will utilize the mean value of a filtered image to represent the images as a discrete value suitable for Outlier Filter Process 213. However, other statistical values may also be utilized, such as the median value of each filtered image. See FIG. 4 for illustration of mean NDVI values of images in a time-series.

For this embodiment, Image Processing 212 will calculate the NDVI for each filtered image; these images will be known as either the processed images or the NDVI images. The mean NDVI values calculated from each processed image are hereafter referred to as the mean NDVI values and will be utilized by Outlier Filter Process 213 and later in NDVI Adjustment 500.

Trend Module 300. Trend Module 300 is a least-square regression algorithm that takes an array of data values and other user defined parameters to compute a best fit line for the data. Trend Module 300 is utilized by Outlier Filter Process 213. There are many open-source models and algorithms to do this computation. The Savitzky-Golay filter and locally weighted scatterplot smoothing (LOWESS) are just a few examples of commonly used algorithms used to compute a best fit line, or trend line, for an array of data values. For this embodiment, the Savitzky-Golay filter as documented and computed in Scipy's signal processing module will be used with a polynomial order of 3. Any best fit lines produced using any valid Trend Module 300 algorithm will be referred to as the trend or trend line of the data. See FIG. 4 for an example of a trend line computed using Trend Module 300.

Outlier Filter Process 213. The Outlier Filter Process 213, or simply outlier filter, is the process of identifying mean NDVI values in a time-series that are divergent from the trend and flag them as outliers. Outlier mean NDVI values will be flagged as 'rejected' and the corresponding processed NDVI images will be excluded from future processes. See FIG. 4 for example of 'rejected' images in red. The outlier filter utilizes the Trend Module 300 to compute a trend line for a mean NDVI time-series. One embodiment of Outlier Filter Process 213 passes a dynamic window size to Trend Module 300. The window size is calculated by:

$$\text{int(window)} = \left(\frac{\text{length (mean\_NDVI\_values)}}{500}\right) * 101 \quad \text{Equation 2}$$

This is just one method of calculating the window size. Any other methods or a static window size is optional. Trend Module 300 requires the window size to be an odd number; therefore if the result of Equation 2 is even, +1 is added to the window.

Once a trend line is computed, each NDVI value used to compute the trend is assigned a NDVI_trend_difference value. The NDVI_trend_difference value is calculated by taking the difference between the mean NDVI value and the trend value at a given point.

$$\text{NDVI\_trend\_difference} = \text{mean\_NDVI\_value} - \text{trend\_value} \quad \text{Equation 3:}$$

If the NDVI_trend_difference value for a mean NDVI exceeds a critical threshold it will be flagged as an outlier ('rejected') in the mean NDVI dataset and should be ignored in any future HCA processes. For this embodiment of HCA, the critical NDVI_trend_difference thresholds of −0.05 and +0.07 were used. The resulting mean NDVI time-series dataset is now free of outlier data points that may impact future processing and will be hereafter referred to as the mean NDVI values. See FIG. 4 for examples of accepted mean NDVI values in a timeseries, a trend line as computed by Trend Module 300, NDVI_trend_difference, and rejected images as a result of the outlier filter process.

Other potential outlier filter methods exist and should be considered as potential HCA embodiments. Images not rejected by the outlier filter process are considered as accepted images and are hereafter referred to as filtered images.

Image Selection Process 214. Image selection process 214, or simply image selection, is a processing step that selects images suitable for further processing from the pool of filtered images. As discussed in Image Selection Process 200, a minimum of two images are selected around an event date; the selected images are referred to as the pre-event and post-event images. Image Selection Process 214 will identify the pre-event and post-event images from the pool of filtered images. For this embodiment, the event date corresponds to a hail event over an agricultural field on Jul. 5, 2019; a single pre-event image and two post-event images will be selected. The two post-event images are referred to as the grower image and agent image respectively. The logic used to identify the pre-event, grower, and agent images are described below.

Pre-event Image Selection. A pre-event image is any filtered image that occurs prior to the given event date. For this embodiment, a pre-event image candidate is an image that meets the following selection criteria: (i) Pre-event image must occur between 1-7 days prior the event date. (ii) A minimum AOI coverage of 90%. AOI coverage is computed by pre-processing module 130. (iii) A maximum of 5% cloud/shadow covered pixels. Cloud and shadow cover is computed by pre-processing module 130.

If multiple pre-event image candidates are identified, the image with the maximum NDVI is selected as the pre-event image.

Additional or variations of the pre-event image selection criteria are acceptable. If desired, users may bypass the automated pre-event image selection by manually selecting a pre-event image.

Grower Image Selection. For this embodiment of image selection, the grower image is a filtered image that meets specific filtering criteria. If a filtered image meets the following criteria, it is considered a grower image candidate. (i) Grower image must occur after the provided event date. (ii) A maximum of 3 days of separation between the event date and the grower image. (iii) A minimum of 1 days of separation between the event date and the grower image. (iv) A minimum AOI coverage of 90%. AOI coverage is computed by pre-processing module 130. (v) A maximum of 5% cloud/shadow covered pixels within the grower image. Cloud and shadow cover (Cloud_Cover) is computed by pre-processing module 130.

If there are multiple grower image candidates, a selection algorithm is applied to select the optimal image. This selection metric uses the NDVI standard deviation as well as the percent cloud cover. The selection process is as follows:

(i) Calculate the average NDVI standard deviation (NDVI_stdDev) from all candidate images.

(ii) For each grower image candidate, compute the Cloud-Calibrated NDVI Variance Index (CCNVI) by:

$$CCNVI = NDVI\_stdDev - (Cloud_{Cover} * 0.5 * avg_{NDVI_{stdDev}}) \quad \text{Equation 4:}$$

(iii) Select image with the highest CCNVI value. This is the grower image.

Additional or variations of the grower selection criteria are acceptable. If desired, users may bypass the automated grower image selection by manually selecting a post-event image as the grower image.

Agent Image Selection. For this embodiment of image selection, the agent image is a filtered image that meets specific filtering criteria. If a filtered image meets the following criteria, it is considered an agent image candidate. (i) Agent image must occur after the provided event date. (ii) A minimum AOI coverage of 90%. AOI coverage is computed by pre-processing module 130. (iii) A maximum of 5% cloud/shadow covered pixels within the agent image. Cloud and shadow cover is computed by pre-processing module 130. (iv) A minimum of 4 days of separation between the event date and the agent image. (v) A maximum of 12 days of separation between the event date and the agent image. (vi) First, try to select an agent image that occurred within the window of 9 to 12 days after the event date. (vii) If no valid agent image is found, incrementally increase the window size to allow image dates closer to the event date until at least one image meets the agent image selection criteria. (ie: 8-12 days after event date, 7-12, 6-12, . . . 4-12).

If multiple agent image candidates are found, the same selection logic from grower image selection using CCNVI is applied. See Equation 4.

Additional or variations of the agent selection criteria are acceptable. If desired, users may bypass the automated agent image selection by manually selecting a post-event image as the agent image.

Figure 4:
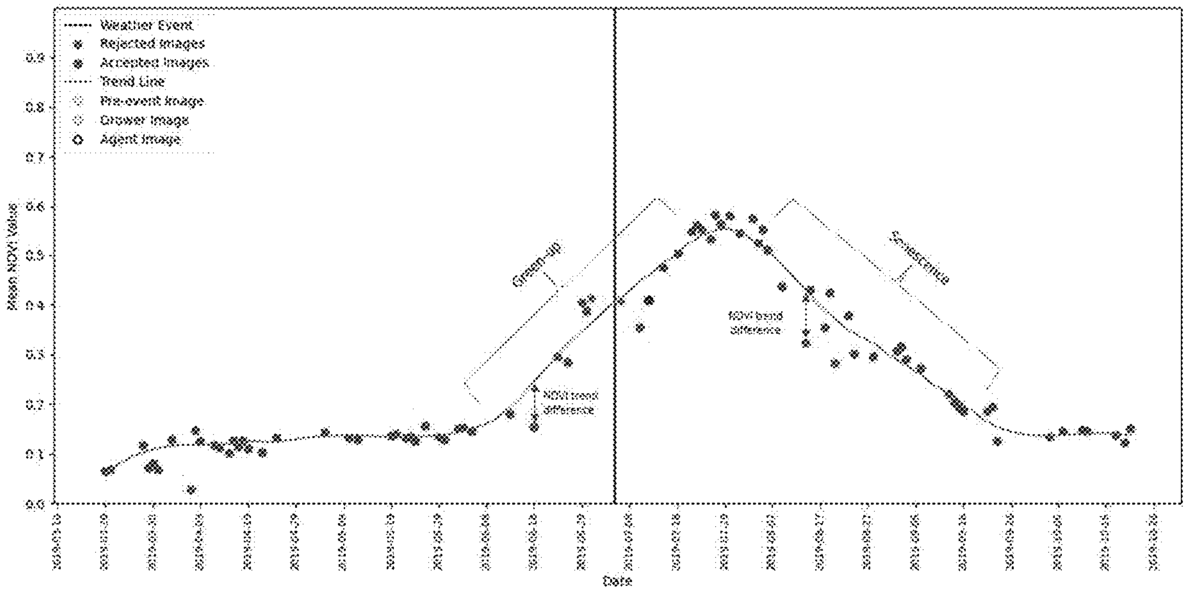
FIG. 4 illustrates mean NDVI values of images in a time-series.

Running the image selection process results in the selection of pre-event and post event image(s). These pre-event and post event image(s) will be compared using HCA Module 400. As long as a pre-event is being compared to a post-event image, various combinations and numbers of pre-event and post-event images are suitable for HCA module. As previously stated, this embodiment will individually compare a single pre-event image to two post-event images—grower image and agent image. FIG. 4. Illustrates the location of the pre-event and post-event images in a timeseries.

Figure 5:
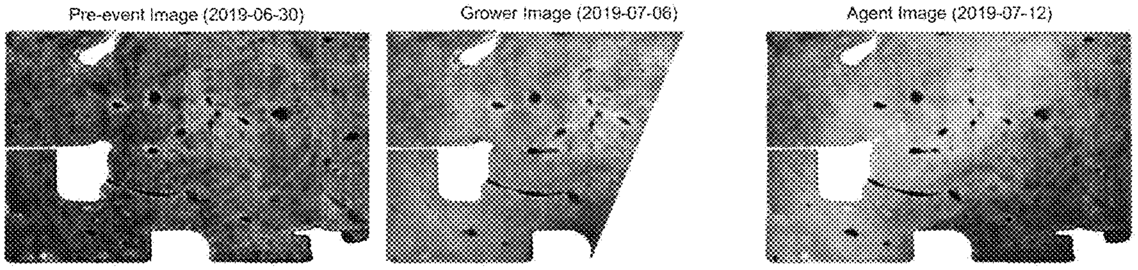
FIG. 5 shows examples of RGB true color images of a selected pre-event image, grower image, and agent image. These images were captured using the Dove satellite constellation. The event date of 2019 Jul. 5 indicates the occurrence of a hail event over this AOI.

FIG. 5 shows examples of a selected pre-event image, grower image, and agent image. The pre-event and agent images were selected via Auto Image Selection 210; the grower image was manually selected via Manual Image Selection 201.

Figure 6:
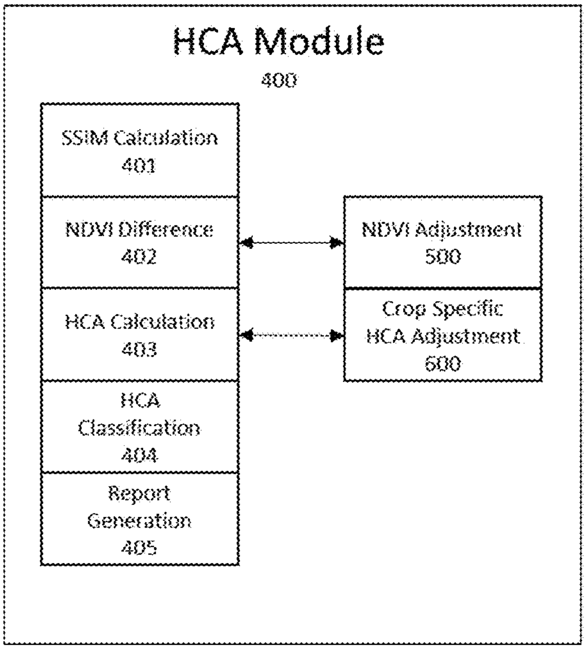
FIG. 6 illustrates the processing steps to run HCA Module.

HCA Module 400. Hybrid Complex Add (HCA) Module 400 may be referred to as HCA module or simply HCA. The HCA module is a means for processing and analyzing satellite imagery to identify changes between images. Images selected via Image Selection 200, or any other method of image selection, can be used as input images for the HCA module. For this embodiment, the HCA module will utilize the pre-event, grower, and agent images selected in Auto Image Selection 210. The HCA module will be used to compare the pre-event and grower image, as well as the pre-event and agent image. FIG. 6 illustrates the processing steps to run HCA Module 400.

Structural Similarity Index Measurement Calculation 401. Structural Similar Index Measurement (SSIM) 401, or SSIM, is an objective method for quantifying the visibility of differences between a reference image and a distorted image. Structural Similarity Index Measurement (SSIM) was first published in IEEE Transactions on Image Processing, Vol 13, No. 4, April 2004. The title of the paper is Image Quality Assessment: From Error Visibility to Structural Similarity [2]. SSIM is an objective method for quantifying the visibility of differences between a reference image and a distorted image using a variety of known properties of the human visual system [2]. Therefore, by utilizing SSIM we can compare and compute the differences between our pre-event (reference image) and post-event image (distorted image) in the HCA module.

This embodiment of HCA module will use the NDVI values of the pre-event and post-event images to compute SSIM. However, other satellite bands or vegetation indices or combination thereof are valid. The SSIM of the pre-event image (x) and post-event image (y) is calculated using the following equation [2]:

$$SSIM(x, y) = \frac{(2u_x u_y + c_1)(2\sigma_{xy} + c_2)}{(u_x^2 + u_y^2 + c_1)(\sigma_x^2 + \sigma_y^2 + c_2)}$$

Where:

x the NDVI of the pre-event image y the NDVI of the post-event image $u_x$ the average of x $u_y$ the average of y $\sigma_x^2$ the variance of x $\sigma_y^2$ the variance of y $\sigma_{xy}$ the covariance of x and y The resulting SSIM image illustrates the differences between the pre-event image and the post-event image. SSIM values range from −1 to 1. SSIM values closer to 1 indicate pixels with higher similarity between the pre-event image and post-event image; values closer to −1 indicate a larger change/difference between pre-event and post-event images. A SSIM value can be computed for every pixel by utilizing a moving window which moves pixel-by-pixel over the entire image; one such filter is the gaussian filter proposed in [2].

Figure 7A:
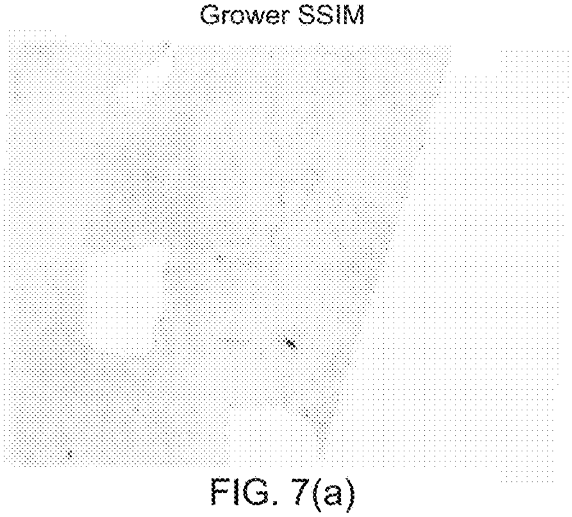
FIG. 7(*a*) shows the result of using SSIM calculation to compare the pre-event image to the grower image in which the average SSIM is 0.977 and FIG. 7(*b*) shows the result of using SSIM calculation to compare the pre-event image with the agent image in which the average SSIM is 0.831. Areas with darker shades of blue indicate pixels with lower SSIM values (more change) and lighter blues indicate pixels with SSIM values approaching 1 (no change).
Figure 7B:
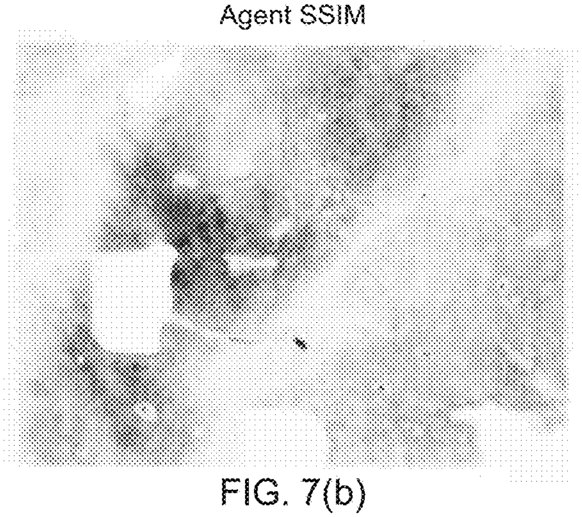

The resulting image created by computing SSIM over an entire image (pixel-by-pixel), will hereafter be referred to as the SSIM image. Images created by computing SSIM over an entire image using SSIM process 401 are hereafter collectively referred to as SSIM images or, more specifically, grower SSIM and agent SSIM which are calculated on the grower and agent image respectively. FIG. 7 shows the resulting SSIM images after comparing the pre-event to the grower and agent images.

As demonstrated, SSIM is useful in quantifying and identifying areas of change between a pre-event and post-event image. However, in terms of vegetation health, SSIM is unable to indicate whether that change had a positive or negative impact on the vegetation. Thus, another variable was used to gauge the positive or negative implications of the change on vegetation health, as described in NDVI Difference 402 below. As previously described, NDVI can act as a good indicator for vegetation health.

Figure 8A:
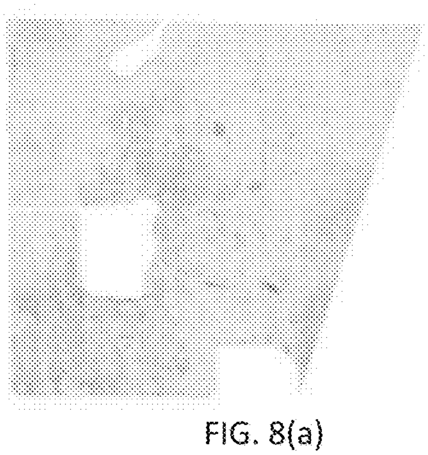
FIG. 8(*a*) illustrates the ndvi_difference results between the pre-event NDVI and the grower image NDVI by using NDVI Difference process in which the average ndvi_difference is −0.016, and FIG. 8(*b*) illustrates the ndvi_difference results between the pre-event NDVI and the agent image NDVI by using NDVI Difference process in which the average ndvi_difference is −0.004. In preferred embodiments, a continuous color ramp (red-yellow-green) is stretched between min and max values of −0.35 and +0.35 such that green areas represent a positive change in NDVI, while red indicate a negative change, and light yellow areas represent pixels with change close to 0.
Figure 8B:
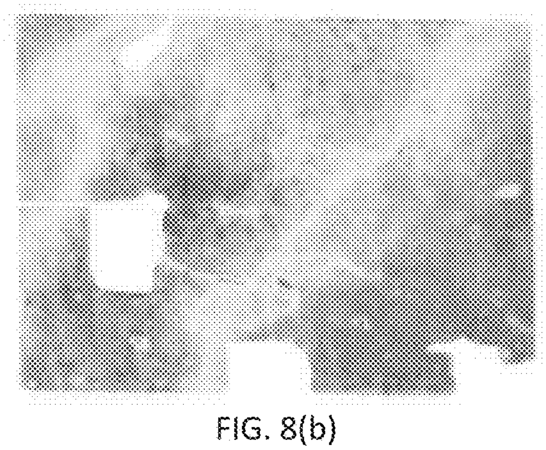

NDVI Difference 402. NDVI Difference 402 is the process of computing the NDVI difference between the pre-event image and the post-event image. The NDVI for the pre-event and each post-event image can be calculated by using equation 1. NDVI difference is calculated by subtracting the NDVI of the pre-event image from the post-event image.

ndvi_difference=ndvi_postEvent−ndvi_preEvent    Equation 6:

By calculating the NDVI difference we can identify areas where the NDVI increased, decreased, or stayed relatively the same. FIG. 8 illustrates the results of running process 402, NDVI Difference, between the pre-event and post-event images.

Images created by running process NDVI Difference 402 are hereafter collectively referred to as NDVI difference images or, more specifically, grower NDVI difference and agent NDVI difference. There is an optional step that can be completed prior to computing grower NDVI difference and agent NDVI difference; see NDVI Adjustment 500 for details on shifting image means to the field trend.

NDVI Adjustment 500. NDVI Adjustment 500, or simply NDVI Adjustment, is the optional process of adjusting the ndvi_difference as computed in NDVI Difference 402. NDVI adjustment is used to account for natural/expected changes of NDVI within a crop's vegetative life cycle. It may also help to reduce potential discrepancies between images due to satellite calibrations, atmospheric differences, or other various sources of noise that may have been un-accounted for in pre-processing module 130 or other filtering processes previously mentioned.

One optional method to help reduce discrepancies between images is to utilize trends computed from a NDVI timeseries. The field trend will help reduce discrepancies between image acquisitions while an expected trend can help account for natural changes of NDVI within a crop's life cycle. See FIG. 9 for examples of a field trend and expected trend.

Figure 9:
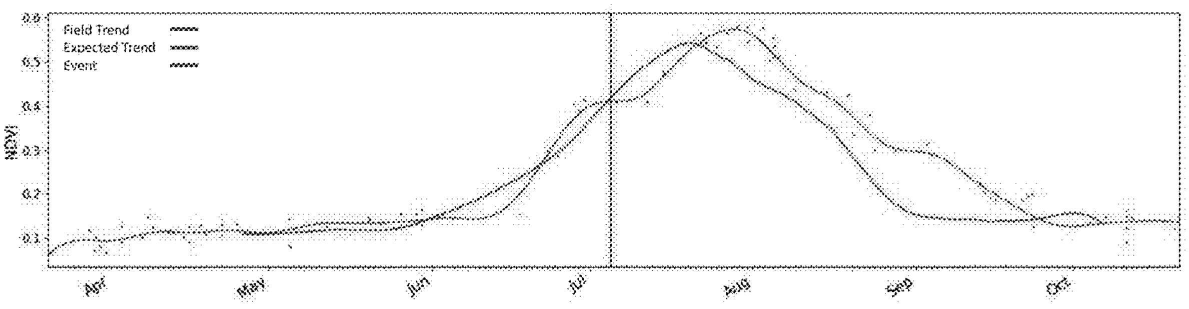
FIG. 9 illustrates the field trend and the expected trend. The field trend and expected trend can be used to help reduce discrepancies between image acquisitions while also account for natural changes of NDVI. The event represents the event date of a hailstorm. The field trend and expected trend were computed using the FACT algorithm described in the PCT patent application published under International Publication Number WO 2023/279198.

The field trend (field_trend) is the trend line computed for mean NDVI image values in a timeseries over a single target field (AOI); see FIG. 9 for example for field trend. The field trend can help reduce discrepancies between images by shifting an image's mean to fall on the field trend value for the image date. To shift an image's mean to the trend's mean, the trend_offset must be computed and then added to each pixel in the image. This results in a new image referred to as the image_shifted_mean, or simply the shifted image. The mean value of the shifted image (image_shifted_mean) will match the mean trend value on a given date (x). Equation 7 shows how to calculate the image_shifted_mean.

$$\text{trend\_offset} = \text{trend\_mean}_x - \text{image\_mean}_x$$

$$\text{image\_shifted\_mean}_{ij} = \text{image}_{pixel_{ij}} + \text{trend\_offset} \quad \text{Equation 7:}$$

Where:

$\text{trend\_mean}_x$ the NDVI value of the trend at date (x)

$\text{image\_mean}_x$ the NDVI value of the image at date (x)

$\text{image}_{pixel_{ij}}$ the NDVI value of a pixel (i,j) in the image

Figure 10:
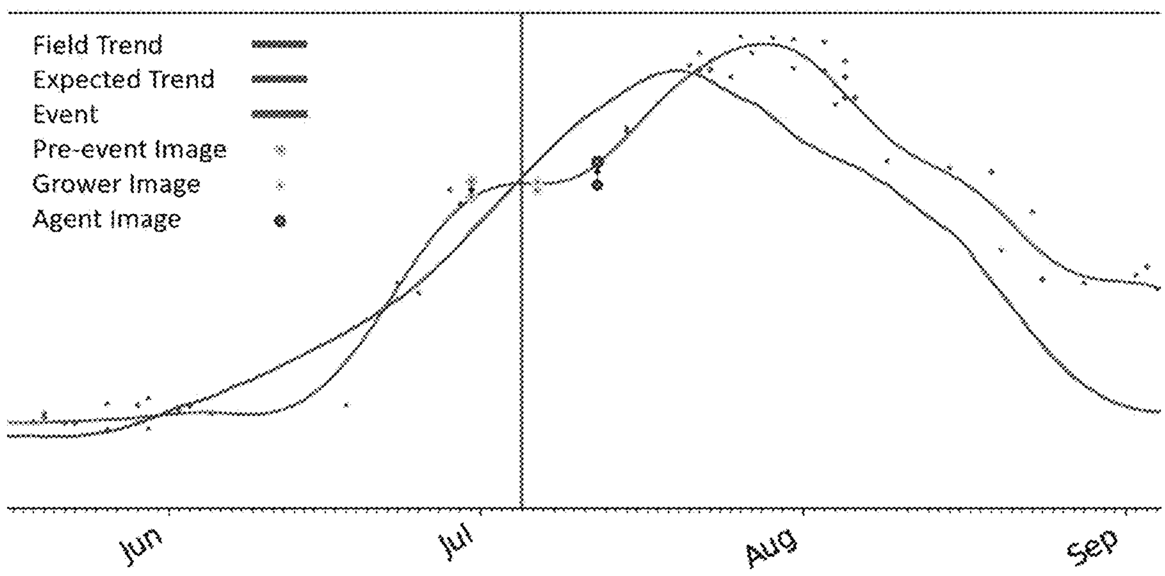
FIG. 10 is a close-up view of FIG. 9 over the months of June, July, and August, and illustrates the process of shifting the NDVI means of the pre-event, grower, and agent images to fall on the field trend. This was done to help reduce discrepancies between image acquisitions.

For example, in FIG. 10, the pre-event image has a mean NDVI of 0.41, while the field_trend is 0.39. Thus, the resulting trend_offset is −0.02 and after all pre-event image pixels have been adjusted with the trend_offset the new mean NDVI of the shifted pre-event image (image_shifted_mean) is 0.39. The results of applying the same logic to the grower and agent image is a shifted grower image with a new NDVI mean of 0.41 and a shifted agent image with a new NDVI mean of 0.43. Applying the same logic to the grower image results in a shifted grower image with the mean NDVI value changing from 0.40→0.41. The mean NDVI of the agent image shifts from 0.41→0.43. See FIG. 10 for graphical representation of shifting pre-event, grower and agent image means to the field trend.

It is optional to shift image means to fall on the field trend values; however, for this embodiment, the shifting of image means to the field trend occurs on the pre-event, grower, and agent images. This step occurs prior to calculating the grower NDVI difference and agent NDVI difference (FIG. 8). After applying the mean image shift to the pre-event, grower, and agent images, they will be hereafter referred to as either the shifted pre-event, shifted grower, and shifted agent images, or simply the pre-event, grower, and agent images.

As previously mentioned, NDVI trends can be used to account for natural/expected changes of NDVI within a crop's vegetative life cycle; this is done by utilizing the field trend and expected trend. The expected trend is the trend line for mean NDVI values in a timeseries over multiple fields that have similar characteristics with the target field. If a field has sufficient similar characteristics to that of the target field, it can be referred to as a candidate field. For example, if the target field is an irrigated wheat field, all candidate fields must also be irrigated wheat fields. Other characteristics or properties may be used to identify the ideal candidate fields; such as spatial proximity to the target field (ie: a candidate field must be within X distance from the target field). Once all potential candidate fields are identified, the expected trend is computed using the mean NDVI image values from all candidate fields. See FIG. 9 for example of expected trend. The expected trend is a representation of what a typical (or expected) NDVI trend should look like for the target field. The Field Average Crop Trend (FACT) algorithm is a series of processes that can be used to compute the expected trend as disclosed in the PCT patent application published under International Publication Number WO 2023/279198. A summary of the FACT algorithm is provided below. For this embodiment, the FACT algorithm was used to compute the Field Trend and Expected Trend as shown in FIG. 9.

By utilizing the expected trend, we can calculate the amount of change to expect over a given period; this is referred to as expected change (expected_change). The expected change over a given period ($x_1$, $x_2$) can be calculated by:

$$\text{expected\_change}_{x_1,x_2} = y_{2\_expected_{x_2}} - y_{1\_expected_{x_1}} \quad \text{Equation 8}$$

Where:

$y_{1\_expected_{x_1}}$ the $NDVI$ value of the expected trend on date $(x_1)$ $y_{2\_expected_{x_2}}$ the $NDVI$ value of the expected trend on date $(x_2)$ Similarly, by utilizing the field trend, we can calculate the amount of actual change that occurred over a given period; this is referred to as actual change (actual_change). The actual change over a given period ($x_1$, $x_2$) can be calculated by:

$$actual\_change_{x_1,x_2} = y_{2\_actual_{x_2}} - y_{1\_actual_{x_1}} \quad \text{Equation 9}$$

Where:

$y_{1\_actual_{x_1}}$ the *NDVI* value of the field trend on date ($x_1$)

$y_{2\_actual_{x_2}}$ the *NDVI* value of the field trend on date ($x_2$)

Figure 11:
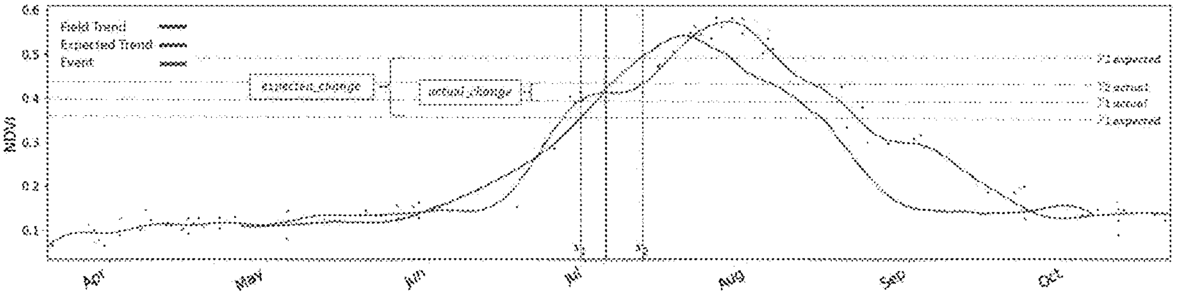
FIG. 11 illustrates the calculation of expected_change_agent and actual_change_agent using the pre-event and agent image dates. Note the actual_change is significantly smaller than the expected_change. This shows that the field's NDVI is not behaving as expected; indicating the event may have had a negative impact on the health of the crop.
Figure 12A:
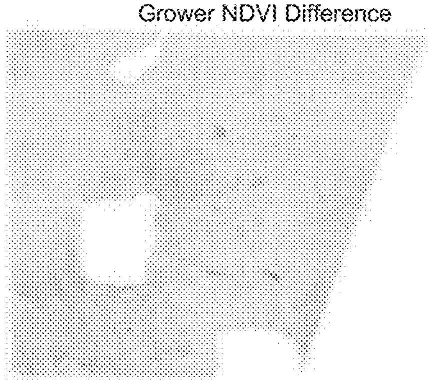
FIG. 12(*a*) illustrates the ndvi_difference results between the pre-event NDVI and the grower image NDVI by using NDVI Difference 402 process in which the average ndvi_difference is −0.016.
Figure 12B:
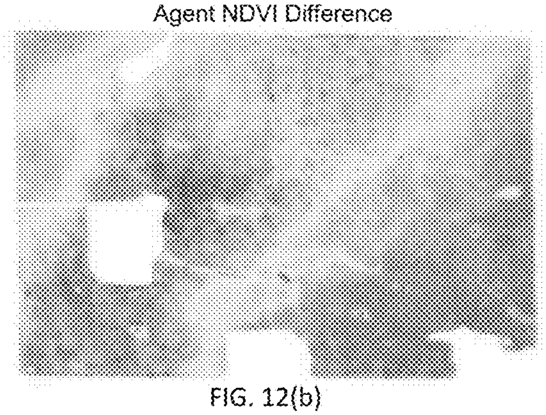
Figure 12C:
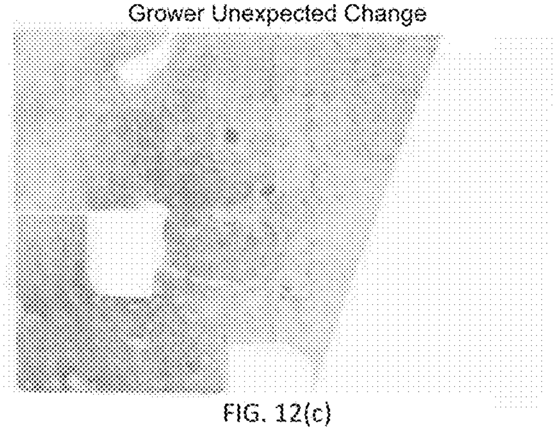
Figure 12D:
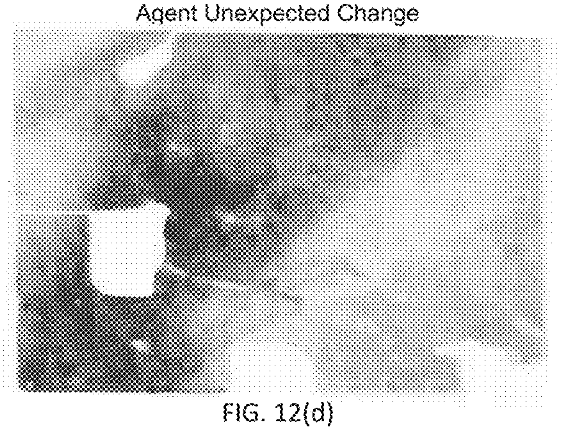

By using equations 8 & 9 we can calculate the actual and expected change between the pre-event image ($x_1$) and agent image ($x_2$). These will be referred to as the actual_change_agent and expected_change_agent respectively. See the calculations below and FIG. 11 for illustrations on calculating expected and actual change between the pre-event and agent images.

$$expected\_change_{agent}=0.49-0.35=0.14$$

$$actual\_change_{agent}=0.43-0.39=0.04$$

Likewise, the expected_change_grower and actual_change_grower can be calculated by following the same methods used to calculate expected_change_agent and actual_change_agent.

The expected_change and actual_change can then be utilized to calculate the unexpected NDVI change (unexpected_change). Unexpected change is the change that occurs between images that cannot be contributed to natural growth or senescence of a crop's lifecycle. Unexpected change can be calculated by:

$$unexpected\_change=actual\_change-expected\_change \quad \text{Equation 10:}$$

Therefore, the unexpected change for the example pre-event and agent image pair (unexpected_change_agent) is:

$$unexpected\_change_{agent}=0.04-0.14=0.10$$

The unexpected change can be calculated at the pixel level for an image by simply subtracting the expected_change from every NDVI pixel.

Unexpected_change can also be calculated at that the pixel level for an image. To do so, the ndvi_difference between the pre-event and post-event image must be calculated first (see NDVI Difference 402 process and optional image_shifted_mean process in NDVI Adjustment 500). The unexpected_change can then be calculated by subtracting the expected change from every ndvi_difference pixel (ij) value as shown below:

$$unexpected\_change_{ij}=ndvi\_difference_{ij}-expected\_change$$

By subtracting the unexpected_change from both the grower NDVI difference and agent NDVI difference (shown in FIG. 8) we can compute the grower unexpected change and agent unexpected change images as shown in FIG. 12. The resulting grower and agent unexpected change images now reflect a more accurate representation of NDVI changes because they adjust NDVI for discrepancies between image acquisitions by shifting image means to the field trend, while also adjusting for natural changes in NDVI by accounting for expected change.

The NDVI Adjustment 500 and its subsequent components are optional. However, if this optional process is utilized, the derived grower unexpected change and agent unexpected change images replace the ndvi_difference images in subsequent processing steps. Thus, further references to ndvi_difference images may be a direct reference to the unexpected change images as calculated in NDVI Adjustment 500. For this embodiment, NDVI Adjustment 500 and its subsequent components are utilized, therefore, unexpected change images are hereafter referred to as ndvi_difference images.

HCA Calculation 403. Hybrid Complex Add (HCA) Calculation 403, or simply HCA, is the process of calculating HCA by utilizing the SSIM and ndvi_difference images previously computed. The resulting HCA image will show areas of change between the pre-event and post-event image while also being able to classify those changes as either positive or negative impacts to the crop's health.

To incorporate SSIM, the SSIM_boost value must be computed for each pixel (i,j); see equation 11. Computing the SSIM_boost value for every pixel results in the SSIM_boost_image. Since SSIM values range from −1 to +1, the SSIM_boost_image values will range from 0 to 2. A SSIM value of 1 indicates there is no change between the two images; thus, the SSIM_boost value is 0 (no boosting power). The SSIM_boost value is used to boost the signal within the ndvi_difference image.

$$SSIM\_boost_{i,j}=1-SSIM_{ij} \quad \text{Equation 11:}$$

Where:

$SSIM_{ij}$ the SSIM value at pixel (i,j)

Figure 13A:
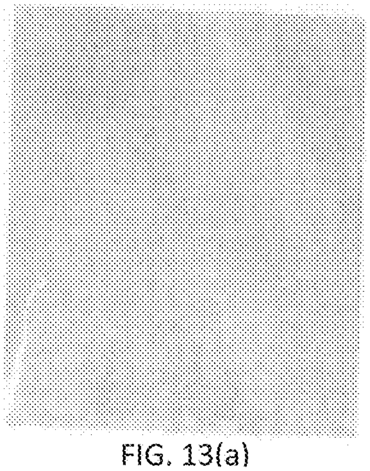
FIG. 13(*a*) illustrates the ndvi_difference results between a pre-event NDVI and a grower image NDVI by using NDVI Difference 402 process in which the average ndvi_difference is −0.064. A continuous color ramp (red-yellow-green) was stretched between min and max values of −0.35 and +0.35. Green areas represent a positive change in NDVI, while red indicate a negative change. Light yellow areas represent pixels with change close to 0.
Figure 13B:

As previously mentioned, SSIM only detects changes within an image, it does not classify those changes as either good or bad; the same is true for the SSIM_boost. However, SSIM has proven to detect changes between images that are not detected in ndvi_difference. FIG. 13 demonstrates the power of SSIM to detect changes between images not seen in NDVI. Thus, by utilizing SSIM we can create a SSIM_boost image to boost smaller changes in ndvi_difference.

To incorporate the SSIM_boost values into the ndvi_difference image we must first create a boolean mask of the ndvi_difference image; this mask will be referred to as the ndvi_change_mask. The ndvi_change_mask will contain values of either −1 or +1. Any negative values in the ndvi_difference image will be assigned a −1 value in the ndvi_change_mask; while any positive values in the ndvi_difference image will be assigned a +1 value.

Next, the change_layer is created. The change layer is a measure of the magnitude of change between the images. The change_layer is calculated by adding SSIM_boost to the absolute value of the ndvi_difference:

$$change\_layer=|ndvi\_difference|+SSIM\_boost \quad \text{Equation 12:}$$

Figure 14A:
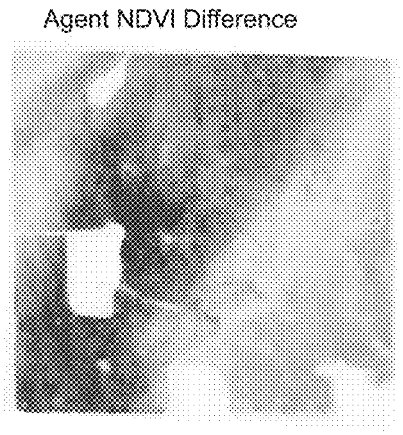
FIG. 14(*a*) illustrates an NDVI difference image derived from NDVI difference, FIG. 14(*b*) illustrates an SSIM difference image derived from SSIM calculation, and FIG. 14(*c*) illustrates an HCA image computed from the NDVI difference image and the SSIM difference image. For visual purposes, HCA is dynamically stretched between the min/max HCA values using a greyscale color ramp.
Figure 14B:
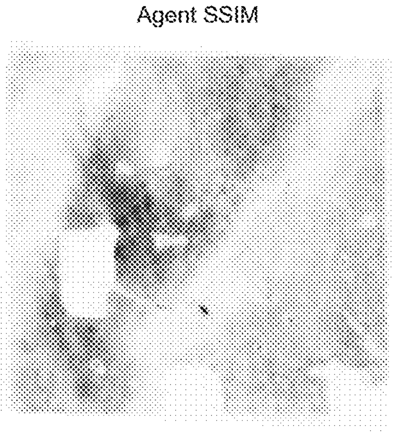
Figure 14C:
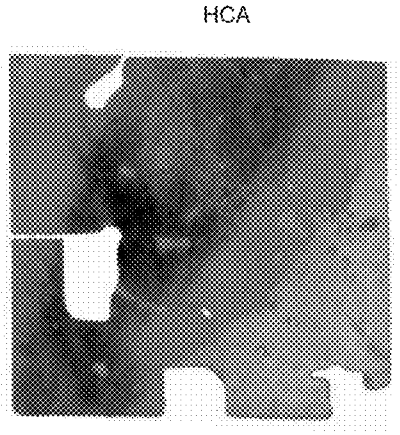

Finally, HCA can be calculated by applying the ndvi_change_mask to the change_layer. By doing so, we can assign positive or negative values to the change_layer; indicating whether the change was good (positive) or bad (negative). See equation 13 for how to calculate HCA and FIG. 14 for example of HCA image output.

$$HCA=change\_layer*ndvi\_change\_mask \quad \text{Equation 13:}$$

A negative HCA value signifies a lower-than-expected change in that pixel; while a positive HCA value indicates a higher-than-expected change in that pixel. In terms of agricultural crop condition, negative HCA values indicate the crop's health is lower than expected, while positive HCA values indicate crop health is exceeding expectations. Lower HCA values mean poorer crop health and higher HCA values mean better crop health. HCA values close to 0 indicate areas where the crop health is performing as expected.

Crop Specific HCA Adjustment 600. Crop Specific HCA Adjustment 600 is the process of adjusting the HCA calculation based on specific crop types. This step is optional but can improve HCA results. For example, Crop Specific HCA Adjustment 600 may be applied for canola fields if one or both of the images being compared (pre-image or post-image) show flowering. To determine if a field is flowering in either the pre-event or post-event image(s), the Normalized Difference Yellowness Index (NDYI) is used. NDYI is calculated by utilizing the green and blue bands of the image in the following equation:

$$NDYI = \frac{(\text{Green} - \text{Blue})}{(\text{Green} + \text{Blue})} \quad \text{Equation 14}$$

The image is classified as flowering if 75% of the pixels reach or exceed a specified NDYI threshold. For this embodiment, an NDYI threshold of 0.02 is used. If either the pre-event or post-event image is flowering, the following modified HCA Calculation logic may be performed instead of running Hybrid Complex Add (HCA) Calculation 403.

Like HCA Calculation 403, Crop Specific HCA Adjustment utilizes the SSIM and ndvi_difference images previously computed. The resulting HCA image will show areas of change between the pre-event and post-event image while also being able to classify those changes as either positive or negative impacts to the crop's health. The HCA logic will change depending on whether one or both the pre/post-event images are flowering.

First, the SSIM_boost is calculated. If the post-event image is flowering and not the pre-event; SSIM_boost is computed by equations 15 & 16. Otherwise, SSIM_boost is calculated by equation 11.

$$\text{inverse\_ssim}_{i,j} = 1 - \text{SSIM}_{ij} \quad \text{Equation 15:}$$

$$\text{SSIM\_boost}_{i,j} = |\text{inverse\_ssim}_{ij} - P_{0.9}(\text{inverse\_ssim})| \quad \text{Equation 16:}$$

Where:

$P_{0.9}$(inverse_ssim) is the 90th percentile of inverse_ssim

Additionally, any SSIM_boost values from equation 16 that exceed a value of 0.2 are lowered to the value of 0.2; thus 0.2 is the cap SSIM_boost value following equation 16.

Next, the NDYI change maskis computed. If the post-event image is flowering, the NDYI change mask is computed by equations 17-19.

$$\text{ndyi\_diff} = \text{ndyi}_{postEvent} - \text{ndyi}_{preEvent} \quad \text{Equation 17:}$$

$$\text{ndyi\_postEvent\_norm} = \text{ndyi}_{postEvent} - \text{median}(\text{ndyi}_{postEvent}) \quad \text{Equation 18:}$$

$$\text{ndyi\_posneg} = \min(\text{ndyi\_diff}, \text{ndyi\_postEvent\_norm}) \quad \text{Equation 19:}$$

Where:

$\text{ndyi}_{postEvent}$ is the NDYI of the post-event image $\text{ndyi}_{preEvent}$ is the NDYI of the pre-event image median($\text{ndyi}_{postEvent}$) is the median value of $\text{ndyi}_{postEvent}$ min(ndyi_diff,ndyi_postEvent_norm) is smallest/lowest between ndyi_diff and ndyi_postEvent_norm Additionally, if only the pre-event image is flowering and there is less than days between the pre-event and post-event images, the NDYI change maskis also computed by equations 17-19.

Once ndyi_posneg is determined, the NDYI change mask is computed by creating a boolean mask of the ndyi_posneg image. If ndyi_posneg is not computed due to neither the pre-event nor post-event images meeting the above flowering conditions, the ndvi_change_mask will be computed using the ndvi_difference image as described in HCA Calculation 403. The ndvi_change_mask will contain values of either −1 or +1. Any negative values in the ndyi_posneg image will be assigned a −1 value in the ndvi_change_mask; while any positive values in the ndyi_posneg image will be assigned a +1 value; no-data values will remain as no-data values.

Next, the change_layer is created. The change layer is a measure of the magnitude of change between the images. If either the pre-event or post-event images are flowering, the change_layer is calculated by equation 20; otherwise, the change layer is calculated as described in HCA Calculation 403.

$$\text{change\_layer} = (|\text{ndvi\_difference}| * 0.5) + \text{SSIM\_boost} * 1.5 \quad \text{Equation 20}$$

HCA is then calculated as normal by following equation 13. A final step to clean up the HCA image can be applied; any pixels in the $\text{ndyi}_{postEvent}$ image with a NDYI value greater than 0.08 are considered invalid and are therefore given a HCA value of 0.0.

Figure 15:
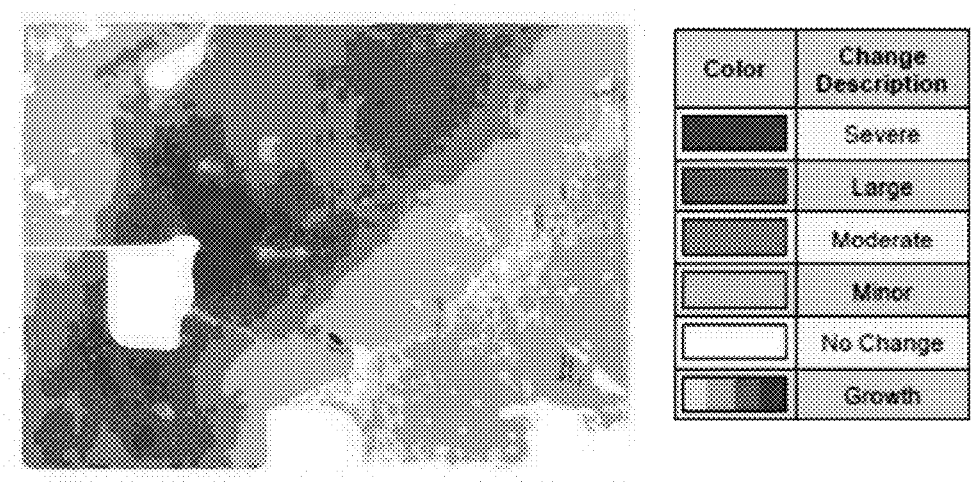
FIG. 15 illustrates the resulting image after classifying HCA according to bin edges. In preferred embodiments, blue, pink, orange, and yellow indicate areas of poor crop health (lower HCA) in which blue indicates the areas with the lowest crop health (lowest HCA values), while teal colors represent areas with highest crop health (positive HCA values) in which compared to lighter teal colors (teal1), darker teal colors (teal4) represent areas with even better crop health.

HCA Classification 404. HCA Classification 404, or simply HCA classification, is the process of classifying the HCA image based on desired thresholds. This is an optional step that can help condense HCA images and make them easier to interpret. For this embodiment, the HCA image is classified into 9 bins using the following bin edges [−0.7, −0.45, −0.15, −0.05, 0.1, 0.2, 0.45, 0.7]. The first bin being any HCA value less-than −0.7 and the last bin containing HCA values greater-than 0.7. These 9 bins correspond to the following colors: blue, pink, orange, yellow, white, teal1, teal2, teal3, teal4; where teal1 is the lightest shade of teal and teal 4 the darkest. Each color can be linked to a change descriptor that can be used to indicate the current crop health status (FIG. 15). Other embodiments of HCA may utilize other bins and colors and are considered valid. See FIG. 15 for example of a classified HCA image, the corresponding colors, and the change description for each color/bin.

Figure 16:
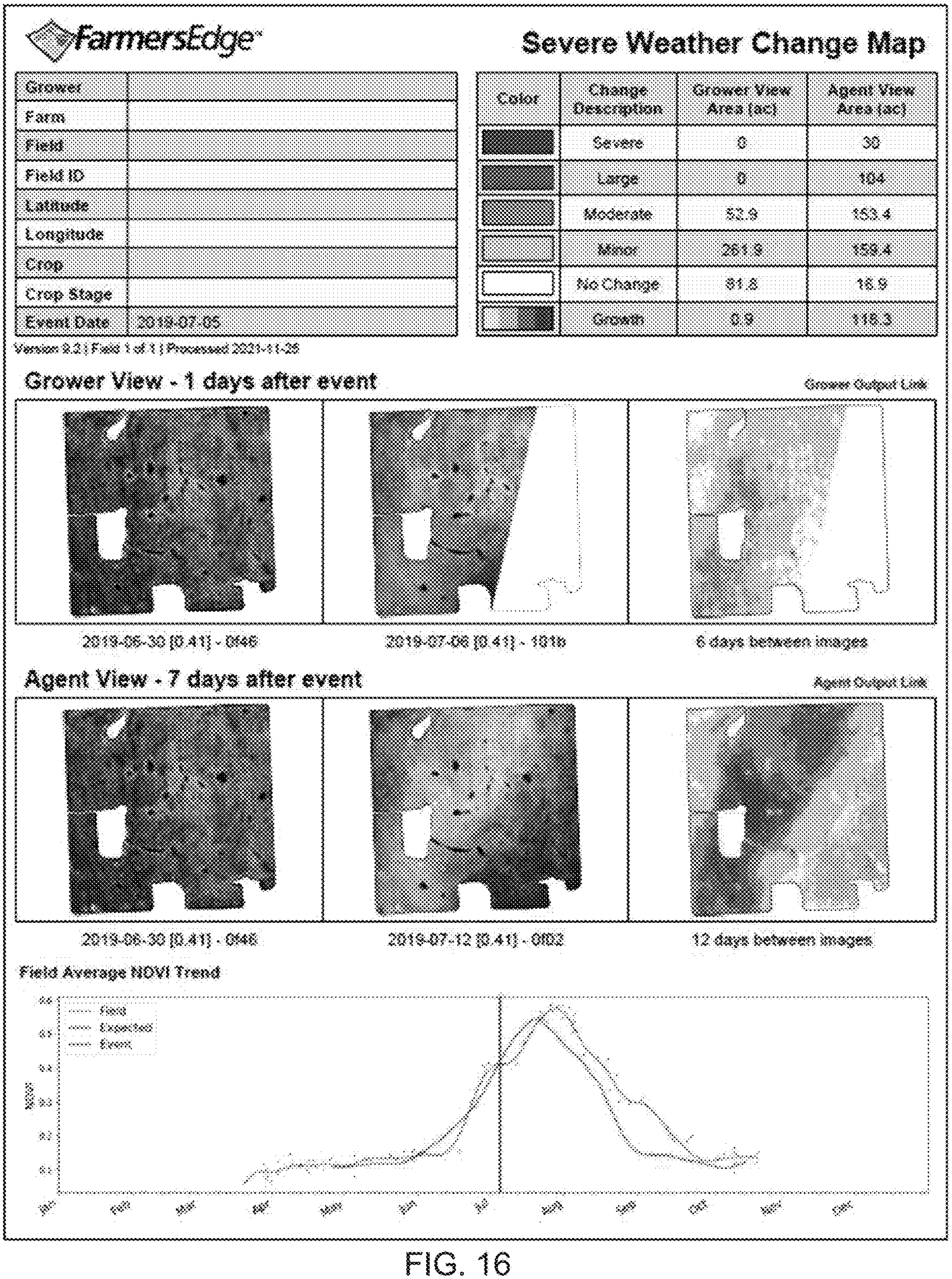
FIG. 16 illustrates a sample PDF that can be used to quickly display data related to the HCA module. The PDF displays the "Event Date" for a hailstorm (2019-07-05). The pre-event, grower image, and agent images along with their corresponding classified HCA images are also displayed. Change description and area count for each classified HCA's are present. The Field Average NDVI Trend graphic represents the data used to compute the unexpected change.

PDF Report 405. PDF Report 405, is the process of creating a PDF report to display data relating to the HCA module in such a way that allows users to quickly digest its valuable information. This is an optional step and simply illustrates a method for displaying the HCA module results. The PDF report may be displayed in the Observation System 160 and/or the Client System 140. Other methods/process for displaying HCA results are considered as valid embodiments of the HCA module. See FIG. 16 for an example PDF report.

Figure 17:
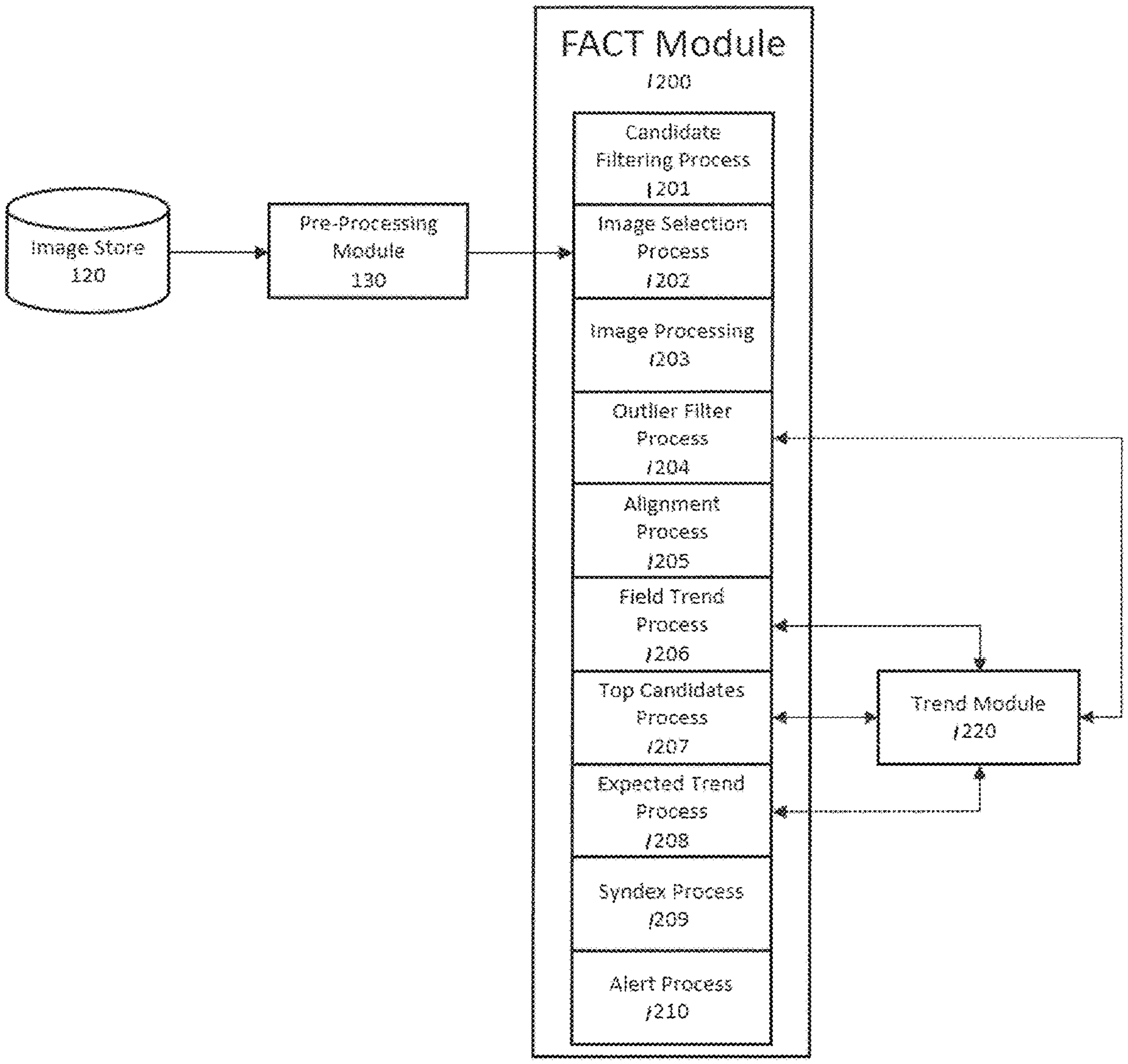
FIG. 17 illustrates the processes required to run the FACT Module.

Field Average Crop Trend (FACT) module 1200. The following description provides a summary of the FACT algorithm referenced above. The Field Average Crop Trend (FACT) module is a component of the network system 110 and is a means for computing and analyzing time-series data of satellite imagery to provide users with valuable insights to make data driven decisions. The processed required to run the FACT module are illustrated in FIG. 17. FACT Module 1200 may be referred to as FACT module or simply FACT. The FACT module is a means for computing and analyzing time-series data of satellite imagery over agricultural fields to provide users with valuable insights to make data driven decisions. FACT can utilize any satellite sensor bands or any indices derived from those bands in its processes and analysis. For simplicity and consistency purposes, this embodiment of the FACT will utilize NDVI time-series data from a target field and candidate fields.

The target field is the agricultural field upon which the user desires to gain valuable insights. Candidate fields are agricultural fields that share similar attributes with the target field. Some similar attributes the target and candidate fields may share are: crop type, spatial proximity, soil characteristics, irrigation practices, etc. By utilizing NDVI time-series data over the target field, FACT can create a target trend that reflects daily NDVI averages over the target field; candidate trends can be computed with similar process over candidate fields. When candidate trends are combined into a single trend it will be referred to as the expected trend. By analyzing the relationship between the NDVI trend of the target field (target trend) and the combined NDVI trends of the candidate fields (expected trend) we can gain valuable insights between these two signals. Such insights may include growth stage development, rates of change (e.g., green-up and senesce rates), crop condition, weather events, crop predictions such as yield, and more. These insights not only allow growers to make data driven decisions regarding their agricultural operation, but it also helps streamline their daily workflows and productivity. Furthermore, the data and analytics computed by FACT can enable other agricultural analysis, such as detecting anomalies (e.g., crop stress) within a field.

Candidate Filtering Process 1201

Candidate Filtering Process 1201, or simply candidate filtering, is the first processing step in FACT module 1200. Candidate filtering is the process of classifying a candidate field as either a valid or invalid candidate field. Classification of a candidate field as either valid or invalid is based on how closely a candidate field's attributes match those of the target field. For this embodiment of FACT, we will assume a hypothetical target field has the following attributes: (i) Crop: Canola; (ii) Seed variety: DKTC 92 SC; (iii) Seeding date: May 22, 2019; (iv) Irrigated: False; (v) Soil: Loam; (vi) Location: X,Y (latitude/longitude of field centroid); (vii) Temperature/weather data: True; and (viii) Hail date: Jul. 15, 2019.

A target fields attributes are in no way restricted to the above attribute list; any other potential field attributes may be added (or removed) from a field attribute list and would be considered valid attributes.

For this embodiment, FACT will assume any candidate fields that have the same crop, are within D distance from location X, Y, and have daily temperature and weather data are valid candidate fields. The variable D is the maximum distance from which the candidate field can be from the target fields location of X, Y. One embodiment of FACT allows for an iterative approach to gradually increase the size of D until a minimum number of good candidate fields are identified. User discretion is used to determine the size of D and the minimum required candidate fields. For this embodiment we will assume a maximum search distance D of 100 km and a minimum of 1 required candidate field. Any candidate fields identified as invalid through the candidate filtering process will not be used in further FACT analysis. At least 1 candidate field must be considered as valid for FACT processing to continue.

Image Selection Process 1202

Image Selection Process 1202, or simply image selection, is the process of selecting images from the pool of pre-processed images as computed in Pre-Processing Module 130. A pre-processed image can be classified as either valid or invalid based on image selection criteria. One embodiment of FACT may use percent field coverage and/or percent invalid pixels of the pre-processed image as image selection criteria. Percent field coverage refers to the percentage of field that is covered by the pre-processed image. Percent invalid pixels refers to the percentage of pixels in the pre-processed image, within the candidate field or target field, that are classified/flagged/removed/deleted or otherwise deemed invalid by the Pre-Processing Module 130. If a pre-processed image does not meet the percent field coverage and/or percent invalid pixels thresholds, set at the user's discretion, it is considered invalid and removed from further processing by FACT. For example, one embodiment of FACT indicates that a valid pre-processed image must cover at least 50% of the field and include no more than 5% invalid pixels; however, other thresholds can be used while still yielding effective results. Pre-processed images that are considered valid by Image Selection Process 1202 will be hereafter referred to as selected images.

Image Processing 1203

Image Processing 1203, or simply image processing, is the process of transforming the selected images (as produced by Image Selection Process 1202) into imagery derivates and discrete data values suitable for time-series analysis.

One embodiment of FACT image processing may apply a calibration correction/coefficient between selected images where their imagery source/sensors are different. For example, applying a calibration coefficient between a Sentinel 2 satellite selected image and SPOT 6 satellite selected image are more closely aligned in their values. Another example is applying a calibration coefficient between Dove-classic and Dove-R satellites.

Image processing may also include the calculation of a vegetation index (VI) for the selected images. Vegetation indices have long been used for remote sensing of vegetation since they often demonstrate high correlations with vegetation properties of interest, such as biomass, photosynthetic activity, crop yield, etc. As an example, Image Processing 1203 may compute the Normalized Difference Vegetation Index (NDVI). The NDVI is calculated by:

$$NDVI = \frac{(NIR - \text{Red})}{(NIR + \text{Red})}$$

where NIR is the image reflectance in the near infrared (NIR) band, and Red is the image reflectance in the Red band. The NDVI is expressed as a decimal value between −1 and 1. NDVI values in the range of 0.2 to 0.8 or higher are typically considered an indication of active vegetation, with higher values being correlated with higher biomass, photosynthetic activity, etc. For this embodiment FACT will utilize NDVI in its processing, however, other embodiments may utilize the individual bands or any other vegetation index or combination of indices.

In order for selected images to be suitable for time-series analysis, Image Processing 1203 must condense the selected images into single discrete values. This embodiment of FACT will utilize the mean value as a method of condensing the selected image into a discrete value suitable for time-series analysis. However, other embodiments may also be utilized such as the median value of each selected image.

For this embodiment of FACT, Image Processing 1203 will calculate the NDVI for each selected image and then calculate the mean NDVI value for each. The mean NDVI value of each selected image will be utilized by subsequent FACT processes and will be simply referred to as the mean NDVI value. See FIG. 18*a* for examples of mean NDVI values.

Trend Module 1220

Trend Module 1220 is a least-square regression algorithm that takes an array of data values and other user defined parameters to compute a best fit line for the data. There are many open-source models and algorithms to do this computation. The Savitzky-Golay filter and locally weighted scatterplot smoothing (LOWESS) are just a few examples of commonly used algorithms used to compute a bit fit line, or trend line, for an array of data values. For this embodiment of FACT, the Savitzky-Golay filter as documented and computed in Scipy's signal processing module (scipy.signal.savgol_filter) will be used with a polynomial order (polyorder) of 3. The window_length parameter determines the number of coefficients and the values varies depending on which FACT process is being run. Any best fit lines produced using any valid Trend Module 1220 algorithm will be referred to as the trend or trend line of the data.

Outlier Filter Process 1204

The Outlier Filter Process 1204, or simply outlier filter, is the process of filtering/flagging mean NDVI values, as computed by Image Processing 1203, as outliers or not. The outlier filter utilizes the Trend Module 1220 to compute a trend line for a mean NDVI time-series. One embodiment of Outlier Filter Process 1204 passes a dynamic window size to Trend Module 1220. The window size is calculated by:

$$\text{int(window)} = \left(\frac{\text{length (mean\_NDVI\_values)}}{500}\right) * 101$$

This is just one method of calculating the window size. Any other methods or a static window size is optional. Trend Module 1220 requires the window size to be an odd number; simply +1 to any window that is even.

Once a trend line is computed, each NDVI value used to compute the trend is assigned a NDVI difference value. The NDVI difference value is calculated by taking the difference between the mean NDVI value and the trend value at a given point.

$$\text{NDVI difference} = \text{mean\_NDVI\_value} - \text{trend\_value}$$

If the NDVI difference value for a mean NDVI exceeds a critical threshold it will be flagged as an outlier in the mean NDVI dataset and should be ignored in any future FACT processes. In one example, the critical NDVI difference thresholds of −0.5 and +0.07 were used; however, other thresholds can be used while still yielding effective results. Any mean NDVI values flagged as an outlier will be removed from subsequent FACT processing. The outlier filtering process occurs for all mean NDVI datasets of the candidate fields and the target field. The resulting mean NDVI time-series dataset is now free of outlier data points that may impact future processing and will be hereafter referred to as the mean NDVI values. See FIG. 18*a* for examples of filtered points.

Other potential outlier filter methods exist and should be considered as potential FACT embodiments.

Alignment Process 1205

Alignment Process 1205, or simply alignment, is the process of aligning each candidate fields mean NDVI time-series to the mean NDVI time-series of the target field. Every field, even those with the same crop, will progress through their natural growth stages at different rates. This variation in growth stages can lead to significant differences in NDVI values between fields on any given day. Thus, NDVI time-series data based on calendar dates is inadequate and the data needs to be properly aligned prior to performing any trend comparisons. One embodiment of FACT utilizes the growing degree days (GDD) metric as a means for alignment. Plants require a specific amount of heat to develop from one stage to the next. GDD is a way of tracking plant growth by assigning a heat value to each day. GDD can be computed by using the seeding date and daily temperature values of the field as inputs into a growth stage (GS) model. The accumulation of GDD values can be used to determine a crops GS (Miller et al., 2001).

By aligning all candidate fields and the target field based on GDD instead of calendar day we remove potential sources of error and misalignment between our candidate fields NDVI values and the target field NDVI values. One embodiment of FACT can convert the GDD aligned NDVI values back to calendar date and still maintain the benefits of GDD alignment. As previously noted, each calendar day can be assigned a GDD. Thus, each calendar day for the target field will have a GDD value; this is known as the target fields GDD/calendar date relationship. Since every candidate field has a GDD value, we can assign their GDD value a new calendar date based on the targe fields GDD/calendar date relationship. For example, on July 1St the target field may have a GDD value of 500. This means all candidate fields with a GDD value of 500 will be assigned a calendar date of July $1^{st}$.

An alternative to Alignment Process 1205 would be to do a cross-correlation between the target field trend and each candidate field trend. This method does not require GDD and thus may be considered as an alternative alignment method if seeding date and temperature data are not available. This cross-correlation method would produce an offset value that could be applied to the candidate field trends to produce better alignment. (Cross-correlation would only occur on a subset of the trends/data to maximize the benefits/accuracy). However, this method would require Alignment Process 1205 to be interjected into the middle of Top Candidates Process 1207.

Other alignment processes exist and should be considered as potential alternatives for Alignment Process 1205.

Field Trend Process 1206

Field Trend Process 1206, or simply field trend process, is the process of computing the target trend from the target field mean NDVI values. One embodiment of the field trend process is to simply input the target fields mean NDVI values into Trend Module 1220 to produce the output target trend values.

The standard window size used in Trend Module 1220 is 21, but any other valid window size should be considered as potential embodiments for FACT and Field Trend Process 1206.

Another embodiment of Field Trend Process 1206 is to add synthetic mean NDVI values to the target fields mean NDVI dataset prior to running Trend Module 1220. A synthetic mean NDVI value, or synthetic point, is a mean NDVI data value that is interjected into the existing mean NDVI time-series dataset. The value of the synthetic point (y-value) is determined by Trend Module 1220. By running Trend Module 1220 with a larger window size, for example 51, the resulting trend is less prone to outliers and gaps in the data. However, the resulting trend may oversimplify the mean NDVI values and lose some of the potential signal in the data. The trend resulting from running Trend Module 1220 with a larger window size will be referred to as the synthetic trend. The index (x-value) within the mean NDVI time-series is based on user preference. An embodiment of FACT may only insert a synthetic value whenever there is a significant gap in the mean NDVI time-series. An example of a significant gap in mean NDVI values may be any instance where there is no mean NDVI value for 6+ calendar days. Thus, a synthetic point may be inserted into this data gap at the desired index (x-index). Once the synthetic point insertion locations (x-index) been determined; the y-value can be extracted from the synthetic trend at the same x-index in the synthetic trend. This results in mean NDVI dataset that has a synthetic point inserted at x-index with a y-value from the synthetic trend at the same x-index. See FIG. 18 part (a) for examples of synthetic point insertion.

Synthetic points can have a beneficial impact on the target trend. One potential benefit of adding synthetic points is stability in the target trend. Depending on the frequency of mean NDVI values and/or their precision and accuracy, the target trend can potentially behave unexpectedly. This is evident in cases where there are large gaps between mean NDVI values. Adding synthetic points can help alleviate this unexpected behavior by bringing stability to the trend.

Another embodiment of Field Trend Process 1206 is to run multiple iterations of Field Trend Module 1220; using the previous iterations results as inputs for the next iteration. The iterations of Field Trend Module 1220 may result in more refined and polished trends with minimal signal loss. Each iteration of Field Trend Module 1220 may use the same window size as before or it may be changed every iteration or any other valid combination of window sizes.

Any of the forementioned field trend processes or any combination thereof are considered as valid embodiments of Field Trend Process 1206. Any other potential method relating to Field Trend Process 1206 should be considered as a valid embodiment. Processes utilized in Field Trend Process 1206 may also be used to compute a trend on any other valid datasets.

Top Candidates Process 1207

Top Candidates Process 1207, or simply top candidate process, is the process of identifying the top candidate fields from the candidate fields as output by Candidate Filtering Process 1201. This process is done by first ranking the candidate fields based on how well they match the target trend as computed in Field Trend Process 1206; then selecting the top candidate fields based on their rank. Each candidate trend can be computed by following the processing steps in Field Trend Process 1206 or the user may choose to use the trend computed for each candidate in Outlier Filter Process 1204.

One embodiment for ranking candidate fields is by calculating the mean absolute difference between the candidate trend and the target trend. The mean absolute difference is referred to as the candidate trend difference and is calculated by:

$$\text{candidate trend difference}=\text{mean}(\text{abs}(\text{candidate}_{trend}-\text{target}_{trend}))$$

The candidate trend difference value can be calculated using the full trends of both the candidate field and the target field or from a subset of a trend. For example, a FACT embodiment of Top Candidates Process 1207 may only compute the candidate trend difference where portions of the candidate and target trend have a mean NDVI value >0.25 and up to a given calendar date (or GDD). With the candidate trend difference computed for each candidate field, the candidate fields can be ranked in descending order based on their candidate trend difference score. Those candidate fields with lower candidate trend difference are ranked higher and considered closer matches to the target trend. Computing the median absolute difference or sum of the absolute differences are other potential methods for scoring and ranking candidate trends. Other methods for ranking candidate fields exist and should be considered as valid embodiments of Top Candidates Process 1207. Once the method for ranking candidate fields has been completed, the selection of the top candidate fields can begin.

One embodiment for identifying top candidate fields in Top Candidates Process 1207 simply takes the top X candidate fields with the lowest score (ie: lowest candidate trend difference). Where X is the desired number of top candidate fields to use. Another embodiment of Top Candidates Process 1207 identifies top candidates by implementing a critical threshold value. Simply put, any candidate field with a candidate trend difference less-than a critical threshold value would be considered a top candidate. An embodiment of Top Candidates Process 1207 may use a critical threshold value of 0.038 for candidate trend difference. There are many methods or combination of methods to identify top candidates in the Top Candidate Process 1207 that should be considered as valid embodiments of Top Candidate Process 1207.

The top candidate fields identified by Top Candidate Process 1207 are hereafter known as the top candidate fields.

Expected Trend Process 1208

Expected Trend Process 1208, or simply the expected trend process, is the process of combining the trends of the top candidate fields, as identified by Top Candidate Process 1207, into a single expected trend. First, combine the top candidate trends into a combined NDVI time-series dataset. Second, use the combined top candidate dataset to compute the expected trend.

One embodiment of FACT combines the top candidate trends using the median method. This is done by simply computing the median NDVI value per GDD (or calendar day) of the top candidate fields. This results in a single median NDVI value per GDD (or calendar day). Other embodiments of FACT may utilize other methods, such as mean, to combine the top candidate trends in Expected Trend Process 1208. The result of combining the top candidate trends is hereafter referred to as the combine NDVI dataset.

The combined NDVI dataset is then used to compute the expected trend. One embodiment of FACT may feed the combined NDVI dataset directly into Trend Module 1220 to compute the expected trend. Another embodiment may utilize the trend computation processes as outlined in Field Trend Process 1206 to compute the expected trend. Other embodiments exist that will allow the expected trend to be computed using other time-series datasets.

Expected Trend Process 1208 produces what is referred to as the expected trend.

Syndex Process 1209

Syndex Process 1209 is the process of computing the syndex value. The syndex is computed by comparing the target trend and the expected trend. Recall, the target trend is computed by feeding the target field mean NDVI dataset into Field Trend Process 1206 and the expected trend is computed by the expected Trend Process 1208.

The first step to computing syndex is to compute the trend difference. Trend difference is computed by:

$$\text{trend difference}=\text{target}_{trend}-\text{expected}_{trend}$$

Where the $\text{target}_{trend}$ is the time-series dataset of the target trend, and the $\text{expected}_{trend}$ is the time-series dataset of the expected trend. See FIG. 18 part (b) for illustration of trend difference.

Next, syndex is computed by analyzing trend difference at a given window size. The window size used to compute syndex will hereafter be referred to as the syndex window (w). One embodiment of FACT utilizes a syndex window of 7. As illustrated in the following equation, syndex is computed by looking at the change in trend difference at a given syndex window divided by 0.2.

$$\text{syndex}_i = \frac{(\text{trend difference}_i - \text{trend difference}_{i-w})}{0.2}$$

Where trend $\text{difference}_i$ is the value of trend difference at index i and trend $\text{difference}_{i-w}$ is the trend difference value at index i−syndex window (w).

Figure 18:
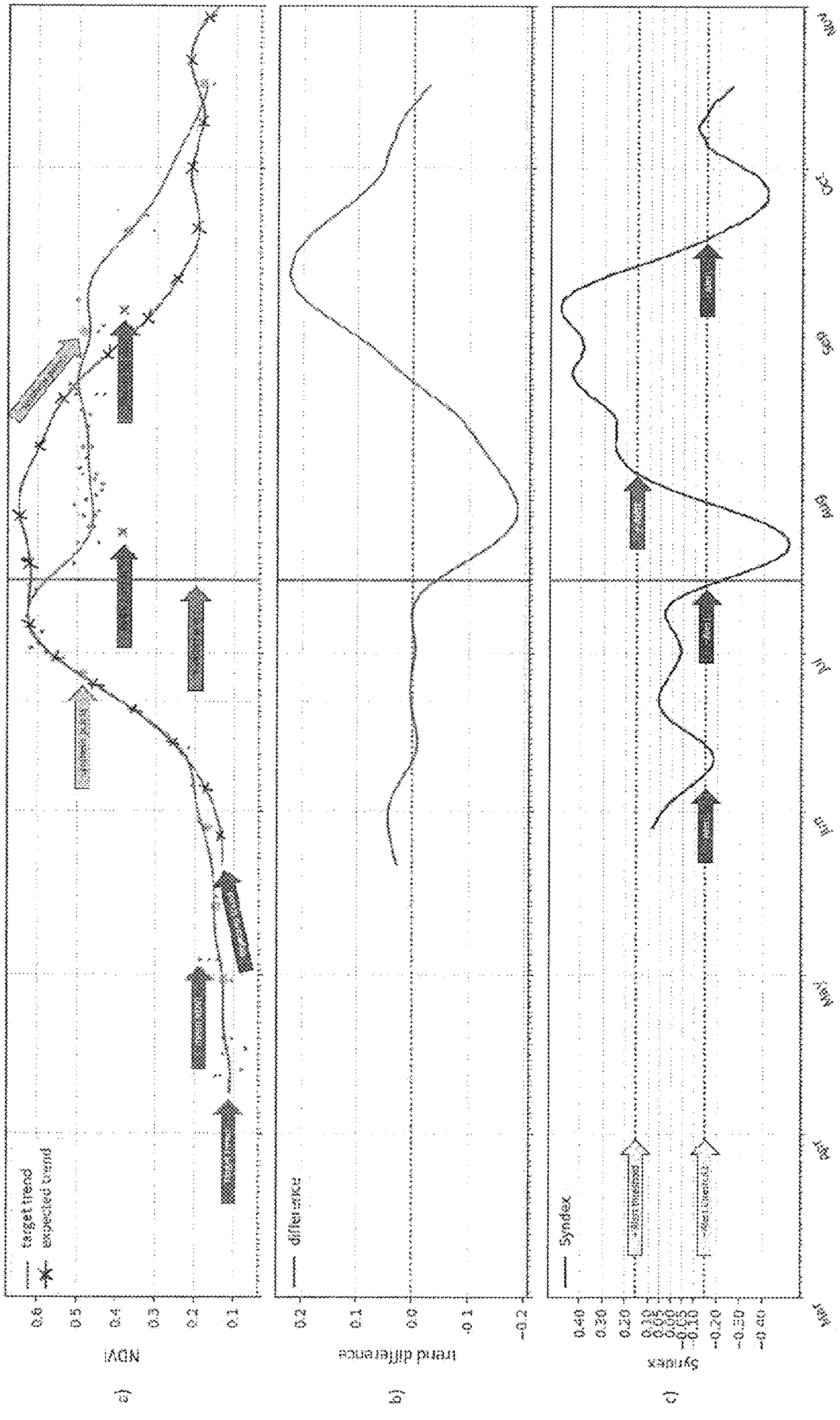
FIG. 18(*a*) illustrates a comparison between the target trend line and the expected trend line utilizing mean NDVI values, and including examples of filtered data points and inserted synthetic data points.

See FIG. 18 part (c) for illustration of the computed syndex value over the entire time-series dataset.

Alert Process 1210

Alert Process 1210, or simply alert process, is the process of alerting/flagging instances where the syndex value passes a critical threshold. This critical syndex threshold will be referred to as an alert threshold. The number of alert thresholds and their value can vary depending upon application, syndex window size used in Syndex Process 1209, and other factors. For this embodiment of FACT, two alert thresholds were used.

The first alert threshold used in this embodiment is +0.15 syndex and is referred to as the + alert threshold. See FIG. 18 part (c) for illustration. This threshold is used to indicate when the relationship between the target trend and the expected trend changes in favor for the target trend. Typically, this threshold is triggered when the trend difference, as computed in Syndex Process 1209, increases in relation to previous values. This can occur when the target trend values increase at a faster rate than the expected trend and/or when the target trend values decrease at a slower rate than the expected trend. There are other possible scenarios where the + alert threshold is triggered.

The second alert threshold used in this embodiment is −0.15 syndex and is referred to as the − alert threshold. See FIG. 18 part (c) for illustration. This threshold is used to indicate when the relationship between the target trend and the expected trend changes in favor for the expected trend. Typically, this threshold is triggered when the trend difference, as computed in Syndex Process 1209, decreases in relation to previous values. This can occur when the target trend values decrease at a faster rate than the expected trend and/or when the target trend values increase at a slower rate than the expected trend. There are other possible scenarios where the − alert threshold is triggered.

Any other alert threshold or variation to Alert Process 1210 should be considered as an alternative FACT embodiment.

Products

There are many potential products that can be either directly or indirectly linked to FACT Module 1200. Any of the outputs, and/or any possible derivates from the analysis (graphics/charts/drawings/etc.), and/or any insights stemming from FACT Module 1200 may be distributed through the System Environment 100 and will hereafter be referred to as the products.

Some examples of insights may include growth stage development, rates of change (e.g., green-up and senesce rates), crop condition, weather events, crop predictions such as yield, and more. These insights not only allow growers to make data driven decisions regarding their agricultural operation, but it also helps streamline their daily workflows and productivity. Furthermore, the data and analytics computed by FACT can enable other agricultural analysis, such as detecting anomalies (e.g., crop stress) within a field.

The products may be delivered though System Environment 100 at any point doing the process and/or when an alert threshold is exceeded in Alert Process 1210.

The following references are referred to above by reference and are incorporated herein by reference:

[1]— International PCT Patent Publication Number WO 2023/279198.

[2]— Wang, Z., Bovik, A. C., Sheikh, H. R., & Simoncelli, E. P. (2004). *Image Quality Assessment: From Error Visibility to Structural Similarity. IEEE Transactions on Image Processing,* 13(4), 600-612. doi: 10.1109/tip.2003.819861

[3]— Ma, Y., Chen, F., Liu, J., He, Y., Duan, J., & Li, X. (2016). An Automatic Procedure for Early Disaster Change Mapping Based on Optical Remote Sensing. Remote Sensing, 8(4), 272. doi:10.3390/rs8040272

[4]— Arnintoosi, M., Fathy, M. & Mozayani, N. Precise image Registration with Structural Similarity Error Measurement Applied to Superresolution. *EURASIP J. Adv. Signal Process.* 2009, 305479 (2009). https://doi.org/10.1155/2009/305479

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A method for crop health change monitoring of a crop growing within a field, the method comprising:

acquiring a first image of the crop growing within the field at a first point in time;

acquiring a second image of the crop growing within the field at a second point in time, in which the first point in time is prior to the second point in time;

calculating a vegetation index difference image comprising difference values representing a difference between corresponding vegetation index values of the second image and corresponding vegetation index values of the first image;

calculating a structural similarity index measurement image by performing a structural similarity index measurement calculation to quantify differences between the first image and the second image;

calculating a change layer comprising magnitude values representing a magnitude of change between the first image and the second image by adding absolute difference values derived from the vegetation index difference image and boost values derived from the structural similarity index measurement image; and generating a hybrid crop health change image indicative of crop health change by converting the magnitude values of the change layer into positive change values and negative change values according to corresponding ones of the difference values of the vegetation index difference image being positive or negative.

2. A system for crop health change monitoring of a crop growing within a field, the system comprising:

a memory storing programming instructions thereon; and a computer processor arranged to execute the programming instructions stored on the memory so as to be arranged to:

acquire a first image of the crop growing within the field at a first point in time;

acquire a second image of the crop growing within the field at a second point in time, in which the first point in time is prior to the second point in time;

calculate a vegetation index difference image as a difference between vegetation index values of the second image and vegetation index values of the first image;

calculate a structural similarity index measurement image by performing a structural similarity index measurement calculation to quantify differences between the first image and the second image;

calculate a change layer comprising magnitude values representing a magnitude of change between the first image and the second image by adding absolute difference values derived from the vegetation index difference image and boost values derived from the structural similarity index measurement image; and generate a hybrid crop health change image indicative of crop health change by converting the magnitude values of the change layer into positive change values and negative change values according to corresponding difference values of the vegetation index difference image being positive or negative.

3. The system according to claim 2 wherein the computer processor is further arranged to generate the hybrid crop health change image classifying the positive change values and the negative change values of the hybrid crop health change image into bins and distinguishing the bins from one another using a color ramp.

4. The system according to claim 2 wherein the computer processor is further arranged to monitor the crop health change relative to an event wherein said first point in time is before the event and said second point in time is after the event.

5. The system according to claim 4 wherein the event comprises a weather event, and wherein the computer processor is further arranged to generate the hybrid crop health change image to be representative of crop damage resulting from the weather event.

6. The system according to claim 4 wherein the computer processor is further arranged to:

acquire a third image of the crop growing within the field at a third point in time, in which the third point in time is subsequent to the second point in time;

calculate a second vegetation index difference image comprising difference values representing a difference between corresponding vegetation index values of the third image and corresponding vegetation index values of the first image;

calculate a second structural similarity index measurement image by performing a structural similarity index measurement calculation to quantify differences between the first image and the third image;

calculate a second change layer comprising magnitude values representing a magnitude of change between the first image and the third image by adding absolute difference values derived from the second vegetation index difference image and boost values derived from the second structural similarity index measurement image; and generate a second hybrid crop health change image indicative of crop health change by converting the magnitude values of the second change layer into positive change values and negative change values according to corresponding ones of the difference values of the second vegetation index difference image being positive or negative.

7. The system according to claim 6 wherein the computer processor is further arranged to generate a report including (i) a visual representation of the hybrid cop health change image derived from the second image, (ii) a visual representation of the second hybrid cop health change image resulting from the third image, and (iii) a plot of average vegetation index values associated with the crop over time including an indication of the event, an indication of the first point in time of the first image, an indication of the second point in time of the second image, and an indication of the third point in time of the third image represented on the plot.

8. The system according to claim 2 wherein the computer processor is further arranged to automatically select the first image and the second image from a time-series of remotely sensed crop images by comparing the crop images to selection criteria.

9. The system according to claim 8 wherein the computer processor is further arranged to monitor crop health change relative to an event wherein said first point in time is before the event and said second point in time is after the event, wherein the selection criteria include a date range relative to said event.

10. The system according to claim 8 wherein the selection criteria include a minimum area of interest coverage threshold.

11. The system according to claim 8 wherein the selection criteria include a maximum cloud or shadow coverage threshold.

12. The system according to claim 2 wherein the computer processor is further arranged to calculate an expected change in vegetation indices between the first point in time and the second point in time representative of natural changes in the crop growing in the field resulting from a natural vegetative life cycle of the crop, and deducting the expected change in vegetation indices in the calculation of said vegetation index difference image.

13. The system according to claim 12 wherein the computer processor is further arranged to calculate the expected change by (i) calculating an expected trend line as a best fit line among mean vegetation index values of a time-series of remotely sensed crop images of crops growing in other fields having similar attributes and (ii) calculating a difference between a vegetation index value on the expected trend line at the first point in time and a vegetation index value on the expected trend line at the second point in time.

14. The system according to claim 2 wherein the computer processor is further arranged to (i) calculating a field trend line as a best fit line among mean vegetation index values of a time-series of remotely sensed crop images of the crop growing within the field, (ii) adjusting the vegetation index values of the first image such that a mean vegetation index value of the first image falls on the field trend line, and (iii) adjusting the vegetation index values of the second image such that a mean vegetation index value of the second image falls on the field trend line.

15. The system according to claim 14 wherein the computer processor is further arranged to:

adjusting the vegetation index values for the first image by (i) calculating a first offset value for the first image corresponding to a difference between the mean vegetation index value of the first image and the trend line at the first point in time and (ii) adding the first offset value to each of the vegetation index values of the first image; and adjusting the vegetation index values for the second image by (i) calculating a second offset value for the second image corresponding to a difference between the mean vegetation index value of the second image and the trend line at the second point in time and (ii) adding the second offset value to each of the vegetation index values of the second image.

16. The system according to claim 2 wherein the computer processor is further arranged to convert the magnitude values of the change layer into positive change values and negative change values by:

for each magnitude value of the change layer corresponding to one of the difference values of the vegetation index difference image being negative, multiplying the magnitude value by −1; and for each magnitude value of the change layer corresponding to one of the difference values of the vegetation index difference image being positive, multiplying the magnitude value by 1.

* * * * *